(12) United States Patent
Steinberg et al.

(10) Patent No.: US 10,120,454 B2
(45) Date of Patent: Nov. 6, 2018

(54) GESTURE RECOGNITION CONTROL DEVICE

(71) Applicant: eyeSight Mobile Technologies Ltd., Herzliya (IL)

(72) Inventors: Erez Steinberg, Tel Aviv (IL); Roey Lehmann, Tel Aviv (IL); Itay Katz, Tel Aviv (IL)

(73) Assignee: eyeSight Mobile Technologies Ltd., Herzliya (IL)

( * ) Notice: Subject to any disclaimer, the term of this patent is extended or adjusted under 35 U.S.C. 154(b) by 11 days.

(21) Appl. No.: 15/257,627

(22) Filed: Sep. 6, 2016

(65) Prior Publication Data

US 2017/0068322 A1    Mar. 9, 2017

Related U.S. Application Data

(60) Provisional application No. 62/214,253, filed on Sep. 4, 2015.

(51) Int. Cl.
*G06F 3/00* (2006.01)
*G06F 3/01* (2006.01)

(52) U.S. Cl.
CPC .............. *G06F 3/017* (2013.01); *G06F 3/005* (2013.01)

(58) Field of Classification Search
CPC .................................. G06F 3/017; G06F 3/005
See application file for complete search history.

(56) References Cited

U.S. PATENT DOCUMENTS

| 8,897,491 B2 * | 11/2014 | Ambrus ................ G06F 3/0425 382/100 |
| 2010/0235786 A1 * | 9/2010 | Maizels ................. G06F 3/011 715/810 |
| 2015/0220149 A1 * | 8/2015 | Plagemann ............ G06F 3/017 715/856 |

* cited by examiner

*Primary Examiner* — Muhammad N Edun
(74) *Attorney, Agent, or Firm* — FisherBroyles, LLP; Ariel Reinitz

(57) ABSTRACT

Systems, devices, methods, and non-transitory computer-readable media are provided for gesture recognition and control. For example, a processor of a gesture recognition system may be configured to receive first image(s) from an image sensor and process the image(s) to detect a first position of an object. The processor may also define a first navigation region in relation to the position and define a second navigation region in relation to the first navigation region, the second region surrounding the first region. The processor may also receive second image(s) from the image sensor and process the image(s) to detect a transition of the object from the first region to the second region. The processor may also determine a first command associated with a device and that corresponds to the transition of the object from the first region to the second region and provide the determined command to the device.

20 Claims, 10 Drawing Sheets

GESTURE RECOGNITION CONTROL DEVICE

CROSS-REFERENCE TO RELATED APPLICATION

This application is related to and claims the benefit of U.S. Patent Application No. 62/214,253, filed Sep. 4, 2015 which is incorporated herein by reference in its entirety.

TECHNICAL FIELD

The present disclosure relates to the field of gesture detection and, more particularly, devices and computer-readable media for gesture recognition and control.

BACKGROUND

Permitting a user to interact with a device or an application running on a device can be useful in many different settings. For example, keyboards, mice, and joysticks are often included with electronic systems to enable a user to input data, manipulate data, and cause a processor of the system to execute a variety of other actions. Increasingly, however, touch-based input devices, such as keyboards, mice, and joysticks, are being replaced by, or supplemented with devices that permit touch-free user interaction. For example, a system may include an image sensor to capture images of a user, including, for example, a user's hand and/or fingers. A processor may be configured to receive such images and initiate actions based on touch-free gestures performed by the user.

SUMMARY

In one disclosed embodiment, a gesture recognition control device is disclosed. The gesture recognition system can include at least one processor. The processor may be configured to receive one or more first images from an image sensor. The processor may also be configured to process the one or more first images to detect a first position of an object. The processor may also be configured to define a first navigation region in relation to the position of the object. The processor may also be configured to define a second navigation region in relation to the first navigation region, the second navigation region surrounding the first navigation region. The processor may also be configured to receive one or more second images from the image sensor. The processor may also be configured to process the one or more second images to detect a transition of the object from the first navigation region to the second navigation region. The processor may also be configured to determine a first command associated with a device and that corresponds to the transition of the object from the first navigation region to the second navigation region. The processor may also be configured to provide the determined first command to the device.

Additional aspects related to the embodiments will be set forth in part in the description which follows, and in part will be understood from the description, or may be learned by practice of the disclosed embodiments.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
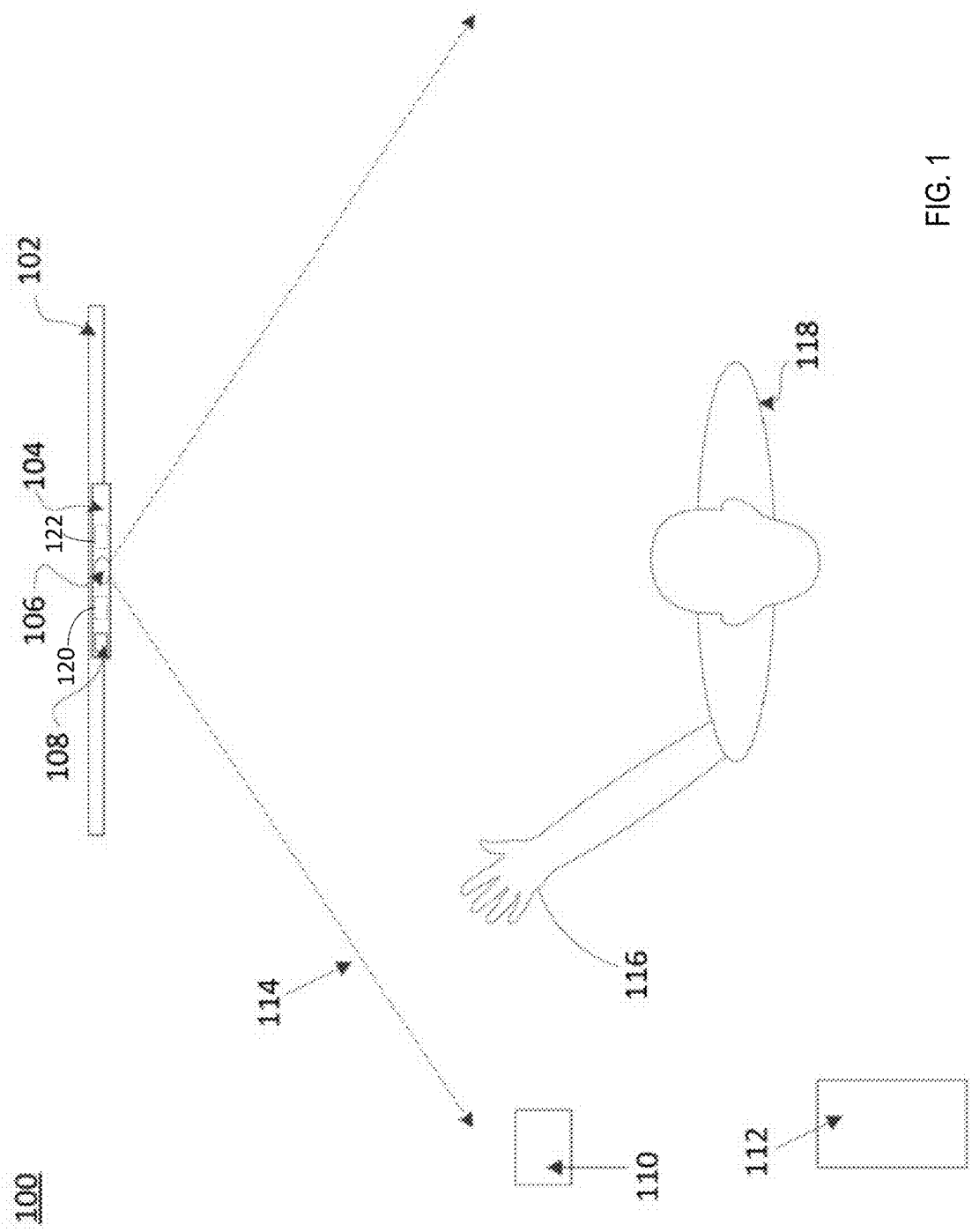
FIG. 1 illustrates an example system for implementing the disclosed embodiments.

Aspects and implementations of the present disclosure relate to data processing, and more specifically, to gesture recognition and control.

Devices, including a variety of consumer electronics, often permit user interaction by way of touch-based components, such as, for example, mice, keyboards, or remote controllers. Such devices can include, for example, a personal computer (PC), an entertainment device, a set top box, a television, a mobile game machine, a mobile phone, a tablet computer, an e-reader, a portable game console, a portable computer such as a laptop or ultrabook, a home appliance such as a kitchen appliance, a communication device, an air conditioning thermostat, a docking station, a game machine such as a mobile video gaming device, a digital camera, a watch, an entertainment device, speakers, a Smart Home device, a media player or media system, a location-based device, a pico projector or an embedded projector, a medical device such as a medical display device, a vehicle, an in-car/in-air infotainment system, a navigation system, a wearable device, an augmented reality-enabled device, wearable goggles, a robot, interactive digital signage, a digital kiosk, a vending machine, an automated teller machine (ATM), or any other apparatus that may receive data from a user.

Typically, such devices do not permit user interaction by way of touch-free gesture recognition. For example, in typical devices, motions made by a user's hand do not affect operation of the device. Increasingly, however, touch-based input components, such as keyboards, mice, and remote controls, are being replaced by, or supplemented with, devices that permit touch-free user interaction. For example, a system may include an image sensor to capture images of a user, including, for example, a user's hands and/or fingers. A processor may be configured to receive such images and cause actions to occur based on touch-free gestures performed by the user. However, systems that do not permit touch-free gesture control cannot typically have such control added.

Permitting a user to interact with a device or an application running on a device can be useful in many different settings. For example, keyboards, mice, and joysticks are often included with electronic systems to enable a user to input data, manipulate data, and cause a processor of the system to execute a variety of other actions. Increasingly, however, touch-based input devices, such as keyboards, mice, and joysticks, are being replaced by, or supplemented with devices that permit touch-free user interaction. For example, a system may include an image sensor to capture images of a user, including, for example, a user's hand and/or fingers. A processor may be configured to receive such images and initiate actions based on touch-free gestures performed by the user.

In today's increasingly fast-paced, high-tech society, user experience and 'ease of activity' have become important factors in the choices that users make when selecting devices. Touch-free interaction techniques are already well on the way to becoming available on a wide scale, and the ability to control existing devices via touch-free gestures (e.g. pointing) can further enhance the user experience.

FIG. 1 is a diagram illustrating an example touch-free gesture recognition system 100. System 100 may include some or all of the following components: a display device 102, a gesture recognition device 104, an IR repeater/extender 110, and one or more other components such as audio speakers 112. Display device 102 and audio speakers 112 may be, for example, devices that are not configured to be controlled by touch-free gestures.

Display device 102 may include, for example, one or more of a television set, computer monitor, head-mounted display, broadcast reference monitor, a liquid crystal display (LCD) screen, a light-emitting diode (LED) based display, an LED-backlit LCD display, a cathode ray tube (CRT) display, an electroluminescent (ELD) display, an electronic paper/ink display, a plasma display panel, an organic light-emitting diode (OLED) display, thin-film transistor display (TIT), High-Performance Addressing display (HPA), a surface-conduction electron-emitter display, a quantum dot display, an interferometric modulator display, a swept-volume display, a carbon nanotube display, a variforcal mirror display, an emissive volume display, a laser display, a holographic display, a light field display, a projector and surface upon which images are projected, or any other electronic device for outputting visual information. In some embodiments, the display device 102 is positioned in the touch-free gesture recognition system 100 such that the display device 102 is viewable by one or more users 118.

It should also be noted that the referenced display device 102 (as well as any other device referenced herein) may include but is not limited to any digital device, including but not limited to: a personal computer (PC), an entertainment device, set top box, television (TV), a mobile game machine, a mobile phone or tablet, e-reader, portable game console, a portable computer such as laptop or ultrabook, all-in-one, TV, connected TV, display device, a home appliance, communication device, air-condition, a docking station, a game machine, a digital camera, a watch, interactive surface, 3D display, an entertainment device, speakers, a smart home device, a kitchen appliance, a media player or media system, a location based device; and a mobile game machine, a pico projector or an embedded projector, a medical device, a medical display device, a vehicle, an in-car/in-air Infotainment system, navigation system, a wearable device, an augment reality enabled device, a wearable goggles, a location based device, a robot, interactive digital signage, digital kiosk, vending machine, an automated teller machine (ATM), and/or any other such device that can receive, output and/or process data such as the commands referenced herein.

It should also be noted that the referenced display device 102 (as well as any other device referenced herein) may include but is not limited to, for example, any plane, surface, or other instrumentality capable of causing a display of images or other visual information. Further, the display may include any type of projector that projects images or visual information onto a plane or surface. For example, the display may include one or more of a television set, computer monitor, head-mounted display, broadcast reference monitor, a liquid crystal display (LCD) screen, a light-emitting diode (LED) based display, an LED-backlit LCD display, a cathode ray tube (CRT) display, an electroluminescent (ELD) display, an electronic paper/ink display, a plasma display panel, an organic light-emitting diode (OLED) display, thin-film transistor display (TFT), High-Performance Addressing display (HPA), a surface-conduction electron-emitter display, a quantum dot display, an interferometric modulator display, a swept-volume display, a carbon nanotube display, a variforcal mirror display, an emissive volume display, a laser display, a holographic display, a light field display, a wall, a three-dimensional display, an e-ink display, and any other electronic device for outputting visual information. The display may include or be part of a touch screen.

In certain implementations, display device 102 may be configured, for example, to receive input from a device such as a remote control (not shown). The remote control and the display device 102 may be configured to exchange data in a variety of ways. For example, a remote control may be configured to emit IR light encoded with data. Display device 102 may include an IR receiver to capture the light emitted by the remote control. Display device 102 may be configured to determine the data encoded in the received IR light and perform a function such as, for example, raising volume or changing a television channel.

Gesture recognition device 104 of system 100 can include, among other things, at least one processor 120, memory 122, one or more image sensor(s) 106, and an infra-red light emitting diode (IR LED) 108. The one or more image sensor(s) 106 can be configured to obtain images of a viewing space 114. Images obtained by the one or more image sensors 106 can be input or otherwise provided to one or more processor(s) 120. The processor(s) 120 can analyze the images and determine/identify the presence of an object/pointing element 116, image or location in the viewing space 114 at which the pointing element 116 is pointing. Gesture recognition device 104 may be powered, for example, from a wall outlet, from another device using a cable such as a USB or HDMI, or using one or more batteries. In some embodiments, gesture recognition device 104 may include an infra-red illuminator to allow gesture recognition device 104 to work in low-light or darkness.

Image sensor 106 (e.g., a camera) may include, for example, a CCD image sensor, a CMOS image sensor, a light sensor, an IR sensor, an ultrasonic sensor, a proximity sensor, a shortwave infrared (SWIR) image sensor, a reflectivity sensor, an RGB camera, a black and white camera, or any other device that is capable of sensing visual characteristics of an environment. Moreover, camera 106 may include, for example, a single photosensor or 1-D line sensor capable of scanning an area, a 2-D sensor, or a stereoscopic sensor that includes, for example, a plurality of 2-D image sensors. In certain implementations, a camera, for example, may be associated with a lens for focusing a particular area of light onto an image sensor. The lens can be narrow or wide. A wide lens may be used to get a wide field-of-view, but this may require a high-resolution sensor to get a good recognition distance. Alternatively, two sensors may be used with narrower lenses that have an overlapping field of view; together, they provide a wide field of view, but the cost of two such sensors may be lower than a high-resolution sensor and a wide lens.

In some embodiments, image sensor 106 is positioned to capture images of an area associated with at least some display-viewable locations. For example, image sensor 106 may be positioned to capture images of one or more users 118 viewing the display device 102. However, it should be understood that display device 102 may not necessarily a part of system 100, and image sensor 106 may be positioned at any location to capture images.

Image sensor 106 may view or perceive, for example, a conical or pyramidal volume of space 114. Image sensor 106 may have a fixed position on the display device 102, in which case viewing space 114 is fixed relative to display device 102, may be attached to the display device 102, or may be positioned elsewhere. Images captured by image sensor 106 may be digitized by the image sensor and input to the at least one processor 120, or may be input to the at least one processor 120 in analog form and digitized by the at least one processor of gesture recognition device 104.

It should be noted that sensor(s) 54 as depicted in FIG. 1, as well as the various other sensors depicted in other figures and described and/or referenced herein may include, for example, an image sensor configured to obtain images of a three-dimensional (3-D) viewing space. The image sensor may include any image acquisition device including, for example, one or more of a camera, a light sensor, an infrared (IR) sensor, an ultrasonic sensor, a proximity sensor, a CMOS image sensor, a shortwave infrared (SWIR) image sensor, or a reflectivity sensor, a single photosensor or 1-D line sensor capable of scanning an area, a CCD image sensor, a reflectivity sensor, a depth video system comprising a 3-D image sensor or two or more two-dimensional (2-D) stereoscopic image sensors, and any other device that is capable of sensing visual characteristics of an environment. A user or pointing element situated in the viewing space of the sensor(s) may appear in images obtained by the sensor(s). The sensor(s) may output 2-D or 3-D monochrome, color, or IR video to a processing unit, which may be integrated with the sensor(s) or connected to the sensor(s) by a wired or wireless communication channel.

The at least one processor 120 of gesture recognition device 104 as depicted in FIG. 1, as well as the various other processor(s) depicted in other figures and described and/or referenced herein may include, for example, an electric circuit that performs a logic operation on an input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA), an application-specific integrated circuit (ASIC), or any other circuit suitable for executing instructions or performing logic operations. The at least one processor may be coincident with or may constitute any part of a processing unit such as a processing unit which may include, among other things, a processor and memory that may be used for storing images obtained by the image sensor. The processing unit may include, among other things, a processor and memory that may be used for storing images obtained by the sensor(s). The processing unit and/or the processor may be configured to execute one or more instructions that reside in the processor and/or the memory. Such a memory (e.g., memory 122 as shown in FIG. 1) may include, for example, persistent memory, ROM, EEPROM, EAROM, SRAM, DRAM, DDR SDRAM, flash memory devices, magnetic disks, magneto optical disks, CD-ROM, DVD-ROM, Blu-ray, and the like, and may contain instructions (i.e., software or firmware) or other data. Generally, the at least one processor may receive instructions and data stored by memory. Thus, in some embodiments, the at least one processor executes the software or firmware to perform functions by operating on input data and generating output. However, the at least one processor may also be, for example, dedicated hardware or an application-specific integrated circuit (ASIC) that performs processes by operating on input data and generating output. The at least one processor may be any combination of dedicated hardware, one or more ASICs, one or more general purpose processors, one or more DSPs, one or more GPUs, or one or more other processors capable of processing digital information.

Images captured by sensor 106 may be digitized by sensor 106 and input to processor 120, or may be input to processor 120 in analog form and digitized by processor 120. Exemplary proximity sensors may include, among other things, one or more of a capacitive sensor, a capacitive displacement sensor, a laser rangefinder, a sensor that uses time-of-flight (TOF) technology, an IR sensor, a sensor that detects magnetic distortion, or any other sensor that is capable of generating information indicative of the presence of an object in proximity to the proximity sensor. In some embodiments, the information generated by a proximity sensor may include a distance of the object to the proximity sensor. A proximity sensor may be a single sensor or may be a set of sensors. Although a single sensor 106 is illustrated in FIG. 1, system 100 may include multiple types of sensors and/or multiple sensors of the same type. For example, multiple sensors may be disposed within a single device such as a data input device housing some or all components of system 100, in a single device external to other components of system 100, or in various other configurations having at least one external sensor and at least one sensor built into another component (e.g., processor 120 or a display) of system 100.

Processor 120 may be connected to sensor 106 via one or more wired or wireless communication links, and may receive data from sensor 106 such as images, or any data capable of being collected by sensor 106, such as is described herein. Such sensor data can include, for example, sensor data of a user's hand spaced a distance from the sensor and/or display (e.g., images of a user's hand and fingers 116 gesturing towards an icon or image displayed on a display device 102). Images may include one or more of an analog image captured by sensor 106, a digital image captured or determined by sensor 106, a subset of the digital or analog image captured by sensor 106, digital information further processed by processor 106, a mathematical representation or transformation of information associated with data sensed by sensor 106, information presented as visual information such as frequency data representing the image, conceptual information such as presence of objects in the field of view of the sensor, etc. Images may also include information indicative the state of the sensor and or its parameters during capturing images e.g. exposure, frame rate, resolution of the image, color bit resolution, depth resolution, field of view of sensor 106, including information from other sensor(s) during the capturing of an image, e.g. proximity sensor information, acceleration sensor (e.g., accelerometer) information, information describing further processing that took place further to capture the image, illumination condition during capturing images, features extracted from a digital image by sensor 106, or any other information associated with sensor data sensed by sensor 106. Moreover, the referenced images may include information associated with static images, motion images (i.e., video), or any other visual-based data. In certain implementations, sensor data received from one or more sensor(s) 106 may include motion data, GPS location coordinates and/or direction vectors, eye gaze information, sound data, and any data types measurable by various sensor types. Additionally, in certain implementations, sensor data may include metrics obtained by analyzing combinations of data from two or more sensors.

In certain implementations, processor 120 may receive data from a plurality of sensors via one or more wired or wireless communication links. Processor 120 may also be connected to a display (e.g., display device 102 as depicted in FIG. 1), and may send instructions to the display for displaying one or more images, such as those described and/or referenced herein. It should be understood that in various implementations the described, sensor(s), processor(s), and display(s) may be incorporated within a single device, or distributed across multiple devices having various combinations of the sensor(s), processor(s), and display(s).

As described and/or referenced herein, the referenced processing unit and/or processor(s) may be configured to analyze images obtained by the sensor(s) and track one or more pointing elements (e.g., pointing element 116 as shown in FIG. 1) that may be utilized by the user for interacting with a display. A pointing element may include, for example, a fingertip or hand of a user situated in the viewing space 114 of the sensor. In some embodiments, the pointing element may include, for example, one or more hands of the user, a part of a hand, one or more fingers, one or more parts of a finger, and one or more fingertips, or a hand-held stylus. Although various figures may depict the hand, finger or fingertip as a pointing element, other pointing elements may be similarly used and may serve the same purpose. Thus, wherever the hand, finger, fingertip, etc. is mentioned in the present description it should be considered as an example only and should be broadly interpreted to include other pointing elements as well.

In some embodiments, the processor is configured to cause an action associated with the detected gesture, the detected gesture location, and a relationship between the detected gesture location and the control boundary. The action performed by the processor may be, for example, generation of a message or execution of a command associated with the gesture. For example, the generated message or command may be addressed to any type of destination including, but not limited to, an operating system, one or more services, one or more applications, one or more devices, one or more remote applications, one or more remote services, or one or more remote devices. For example, the referenced processing unit/processor may be configured to present display information, such as an icon, on the display towards which the user may point his/her fingertip. The processor/processing unit may be further configured to indicate an output on the display corresponding to the location pointed at by the user.

It should be noted that, as used herein, a 'command' and/or 'message' can refer to instructions and/or content directed to and/or capable of being received/processed by any type of destination including, but not limited to, one or more of: operating system, one or more services, one or more applications, one or more devices, one or more remote applications, one or more remote services, or one or more remote devices.

As described herein, the described system and related technologies can enable the execution of commands relating to an object or image at which a pointing element is pointing. For example, as shown in FIG. 1 and described herein, system 100 can be configured to perceive or otherwise identify a pointing element 116 that may be for example, a finger, a wand, or stylus. In certain implementations, the system can also includes one or more microphones that can receive/perceive sounds (e.g., within the viewing space or in the vicinity of the viewing space). Sounds picked-up by the one or more microphones can be input/provided to the processor 120. The processor 120 analyzes the sounds picked up while the pointing element is pointing at the object, image or location, such as in order to identify the presence of one or more audio commands/messages within the picked-up sounds. The processor can then interpret the identified message and can determine or identify one or more commands associated with or related to the combination/composite of (a) the object or image at which the pointing element is pointing (as well as, in certain implementations, the type of gesture being provided) and (b) the audio command/message. The processor can then send the identified command(s) to device.

Accordingly, it can be appreciated that the described technologies are directed to and address specific technical challenges and longstanding deficiencies in multiple technical areas, including but not limited to image processing, gesture recognition, and device control. As described in detail herein, the disclosed technologies provide specific, technical solutions to the referenced technical challenges and unmet needs in the referenced technical fields and provide numerous advantages and improvements upon existing approaches.

It should also be understood that the various components referenced herein can be combined together or separated into further components, according to a particular implementation. Additionally, in some implementations, various components may run or be embodied on separate machines. Moreover, some operations of certain of the components are described and illustrated in more detail herein.

The presently disclosed subject matter can also be configured to enable communication with an external device or website, such as in response to a selection of a graphical (or other) element. Such communication can include sending a message to an application running on the external device, a service running on the external device, an operating system running on the external device, a process running on the external device, one or more applications running on a processor of the external device, a software program running in the background of the external device, or to one or more services running on the external device. Additionally, in certain implementations a message can be sent to an application running on the device, a service running on the device, an operating system running on the device, a process running on the device, one or more applications running on a processor of the device, a software program running in the background of the device, or to one or more services running on the device.

The presently disclosed subject matter can also include, responsive to a selection of a graphical (or other) element, sending a message requesting data relating to a graphical element identified in an image from an application running on the external device, a service running on the external device, an operating system running on the external device, a process running on the external device, one or more applications running on a processor of the external device, a software program running in the background of the external device, or to one or more services running on the external device.

The presently disclosed subject matter can also include, responsive to a selection of a graphical element, sending a message requesting a data relating to a graphical element identified in an image from an application running on the device, a service running on the device, an operating system running on the device, a process running on the device, one or more applications running on a processor of the device, a software program running in the background of the device, or to one or more services running on the device.

The message to the external device or website may be or include a command. The command may be selected for example, from a command to run an application on the external device or website, a command to stop an application running on the external device or website, a command to activate a service running on the external device or website, a command to stop a service running on the external device or website, or a command to send data relating to a graphical element identified in an image.

The message to the device may be a command. The command may be selected for example, from a command to run an application on the device, a command to stop an application running on the device or website, a command to activate a service running on the device, a command to stop a service running on the device, or a command to send data relating to a graphical element identified in an image.

The presently disclosed subject matter may further comprise, responsive to a selection of a graphical element, receiving from the external device or website data relating to a graphical element identified in an image and presenting the received data to a user. The communication with the external device or website may be over a communication network.

Commands and/or messages executed by pointing with two hands can include for example selecting an area, zooming in or out of the selected area by moving the fingertips away from or towards each other, rotation of the selected area by a rotational movement of the fingertips. A command and/or message executed by pointing with two fingers can also include creating an interaction between two objects such as combining a music track with a video track or for a gaming interaction such as selecting an object by pointing with one finger, and setting the direction of its movement by pointing to a location on the display with another finger.

The referenced commands may be executed and/or messages may be generated in response to a predefined gesture performed by the user after identification of a location on the display at which the user had been pointing. The system may be configured to detect a gesture and execute an associated command and/or generate an associated message. The detected gestures may include, for example, one or more of a swiping motion, a pinching motion of two fingers, pointing, a left to right gesture, a right to left gesture, an upwards gesture, a downwards gesture, a pushing gesture, opening a clenched fist, opening a clenched first and moving towards the sensor(s) (also known as a "blast" gesture"), a tapping gesture, a waving gesture, a circular gesture performed by finger or hand, a clockwise and/or a counter clockwise gesture, a clapping gesture, a reverse clapping gesture, closing a hand into a fist, a pinching gesture, a reverse pinching gesture, splaying the fingers of a hand, closing together the fingers of a hand, pointing at a graphical element, holding an activating object for a predefined amount of time, clicking on a graphical element, double clicking on a graphical element, clicking on the right side of a graphical element, clicking on the left side of a graphical element, clicking on the bottom of a graphical element, clicking on the top of a graphical element, grasping an object, gesturing towards a graphical element from the right, gesturing towards a graphical element from the left, passing through a graphical element from the left, pushing an object, clapping, waving over a graphical element, a blast gesture, a clockwise or counter clockwise gesture over a graphical element, grasping a graphical element with two fingers, a click-drag-release motion, sliding an icon, and/or any other motion or pose that is detectable by a sensor.

Additionally, in certain implementations the referenced command can be a command to the remote device selected from depressing a virtual key displayed on a display device of the remote device; rotating a selection carousel; switching between desktops, running on the remote device a predefined software application; turning off an application on the remote device; turning speakers on or off; turning volume up or down; locking the remote device, unlocking the remote device, skipping to another track in a media player or between IPTV channels; controlling a navigation application; initiating a call, ending a call, presenting a notification, displaying a notification; navigating in a photo or music album gallery, scrolling web-pages, presenting an email, presenting one or more documents or maps, controlling actions in a game, pointing at a map, zooming-in or out on a map or images, painting on an image, grasping an activatable icon and pulling the activatable icon out form the display device, rotating an activatable icon, emulating touch commands on the remote device, performing one or more multi-touch commands, a touch gesture command, typing, clicking on a displayed video to pause or play, tagging a frame or capturing a frame from the video, presenting an incoming message; answering an incoming call, silencing or rejecting an incoming call, opening an incoming reminder; presenting a notification received from a network community service; presenting a notification generated by the remote device, opening a predefined application, changing the remote device from a locked mode and opening a recent call application, changing the remote device from a locked mode and opening an online service application or browser, changing the remote device from a locked mode and opening an email application, changing the remote device from locked mode and opening an online service application or browser, changing the device from a locked mode and opening a calendar application, changing the device from a locked mode and opening a reminder application, changing the device from a locked mode and opening a predefined application set by a user, set by a manufacturer of the remote device, or set by a service operator, activating an activatable icon, selecting a menu item, moving a pointer on a display, manipulating a touch free mouse, an activatable icon on a display, altering information on a display.

Moreover, in certain implementations the referenced command can be a command to the device selected from depressing a virtual key displayed on a display screen of the first device; rotating a selection carousel; switching between desktops, running on the first device a predefined software application; turning off an application on the first device; turning speakers on or off; turning volume up or down; locking the first device, unlocking the first device, skipping to another track in a media player or between IPTV channels; controlling a navigation application; initiating a call, ending a call, presenting a notification, displaying a notification; navigating in a photo or music album gallery, scrolling web-pages, presenting an email, presenting one or more documents or maps, controlling actions in a game, controlling interactive video or animated content, editing video or images, pointing at a map, zooming-in or out on a map or images, painting on an image, pushing an icon towards a display on the first device, grasping an icon and pulling the icon out form the display device, rotating an icon, emulating touch commands on the first device, performing one or more multi-touch commands, a touch gesture command, typing, clicking on a displayed video to pause or play, editing video or music commands, tagging a frame or capturing a frame from the video, cutting a subset of a video from a video, presenting an incoming message; answering an incoming call, silencing or rejecting an incoming call, opening an incoming reminder; presenting a notification received from a network community service; presenting a notification generated by the first device, opening a predefined application, changing the first device from a locked mode and opening a recent call application, changing the first device from a locked mode and opening an online service application or browser, changing the first device from a locked mode and opening an email application, changing the first device from locked mode and opening an online service application or browser, changing the device from a locked mode and opening a calendar application, changing the device from a locked mode and opening a reminder application, changing the device from a locked mode and opening a predefined application set by a user, set by a manufacturer of the first device, or set by a service operator, activating an icon, selecting a menu item, moving a pointer on a display, manipulating a touch free mouse, an icon on a display, altering information on a display.

Figure 2:
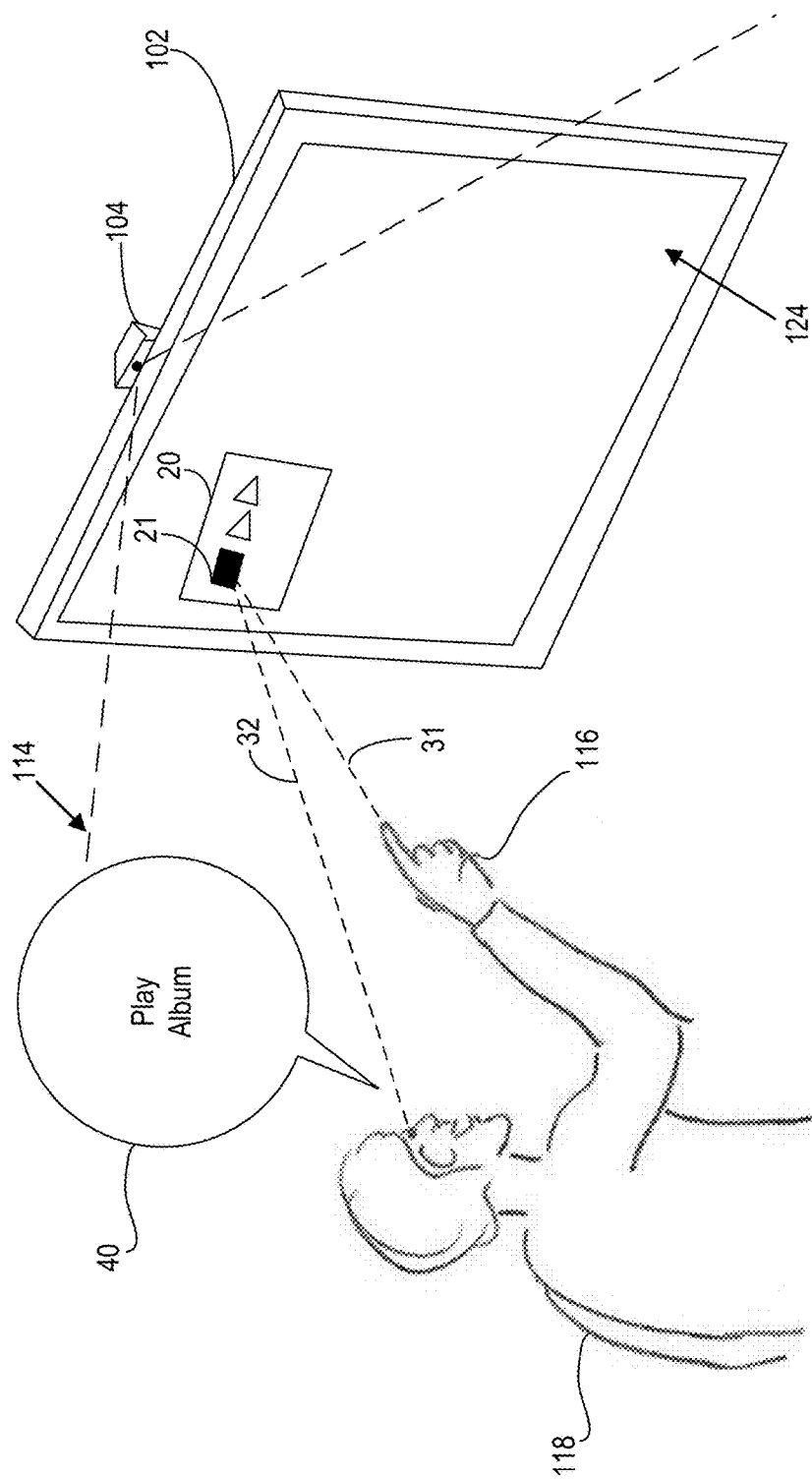
FIG. 2 illustrates an example implementation of the disclosed embodiments.
Figure 3A:
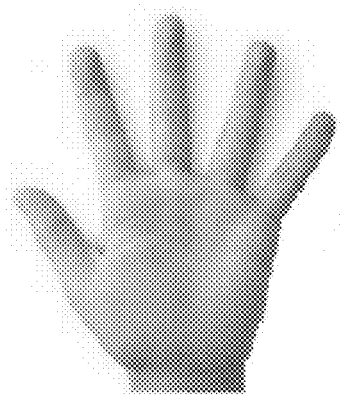
FIGS. 3A-3H illustrate other example implementations of the disclosed embodiments.
Figure 3B:
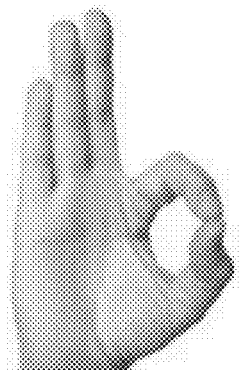
Figure 3C:
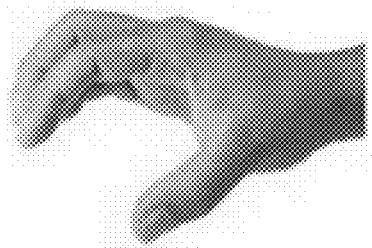
Figure 3D:
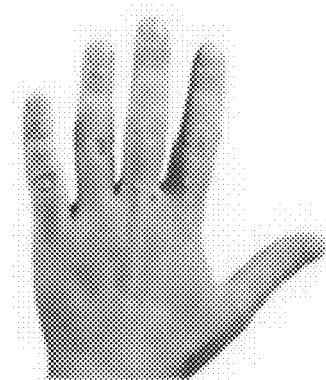
Figure 3F:
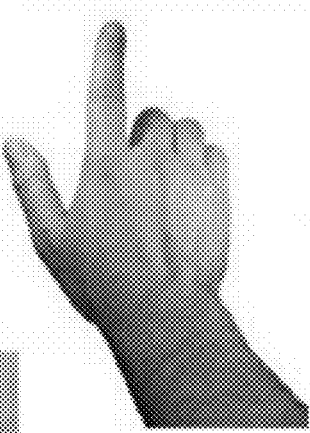
Figure 3E:
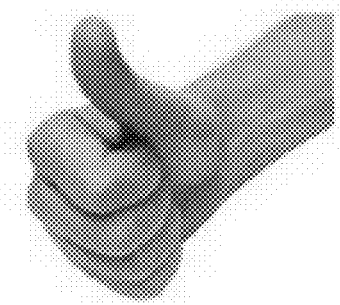
Figure 3G:
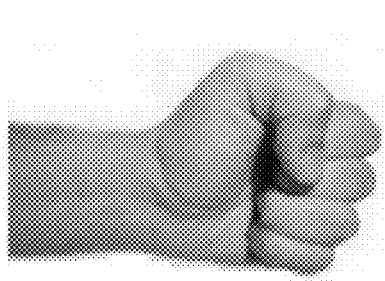
Figure 3H:
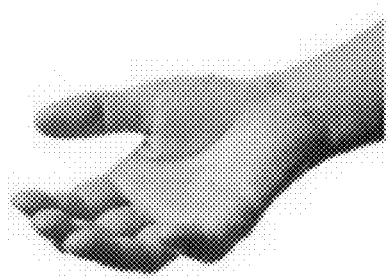

"Movement" as used herein may include one or more of a three-dimensional path through space, speed, acceleration, angular velocity, movement path, and other known characteristics of a change in physical position or location, such as of a user's hands and/or fingers (e.g., as depicted in FIG. 2 and described herein).

"Position" as used herein may include a location within one or more dimensions in a three dimensional space, such as the X, Y, and Z axis coordinates of an object relative to the location of sensor 106. Position may also include a location or distance relative to another object detected in sensor data received from sensor 106. In some embodiments, position may also include a location of one or more hands and/or fingers relative to a user's body, indicative of a posture of the user.

"Orientation" as used herein may include an arrangement of one or more hands or one or more fingers, including a position or a direction in which the hand(s) or finger(s) are pointing. In some embodiments, an "orientation" may involve a position or direction of a detected object relative to another detected object, relative to a field of detection of sensor 106, or relative to a field of detection of the displayed device or displayed content.

A "pose" as used herein may include an arrangement of a hand and/or one or more fingers, determined at a fixed point in time and in a predetermined arrangement in which the hand and/or one or more fingers are positioned relative to one another.

A "gesture" as used herein may include a detected/recognized predefined pattern of movement detected using sensor data received from sensor 106. In some embodiments, gestures may include predefined gestures corresponding to the recognized predefined pattern of movement. The predefined gestures may involve a pattern of movement indicative of manipulating an activatable object, such as typing a keyboard key, clicking a mouse button, or moving a mouse housing. As used herein, an "activatable object" may include any displayed visual representation that, when selected or manipulated, results in data input or performance of a function. In some embodiments, a visual representation may include displayed image item or portion of a displayed image such as a keyboard image, a virtual key, a virtual button, a virtual icon, a virtual knob, a virtual switch, and a virtual slider.

In order to determine the object, image or location at which the pointing element 116 is pointing, the processor 120 may determine the location of the tip of the pointing element and the location of the user's eye in the viewing space 114 and extend a viewing ray from the user's eye through the tip of the pointing element until the viewing ray encounters the object, location or image. Alternatively, the pointing may involve the pointing element performing a gesture in the viewing space that terminates in pointing at the object, image or location. In this case, the processor may be configured to determine the trajectory of the pointing element in the viewing space as the pointing element performs the gesture. The object, image or location at which the pointing element is pointing at the termination of the gesture may be determined by extrapolating/computing the trajectory towards the object, or image or location in the viewing space.

In the case that the pointing element is pointing at a graphical element on a screen, such as an icon, the graphical element, upon being identified by the processor, may be highlighted, for example, by changing the color of the graphical element, or pointing a cursor on the screen at the graphical element. The command may be directed to an application symbolized by the graphical element. In this case, the pointing may be indirect pointing using a moving cursor displayed on the screen.

Figure 4:
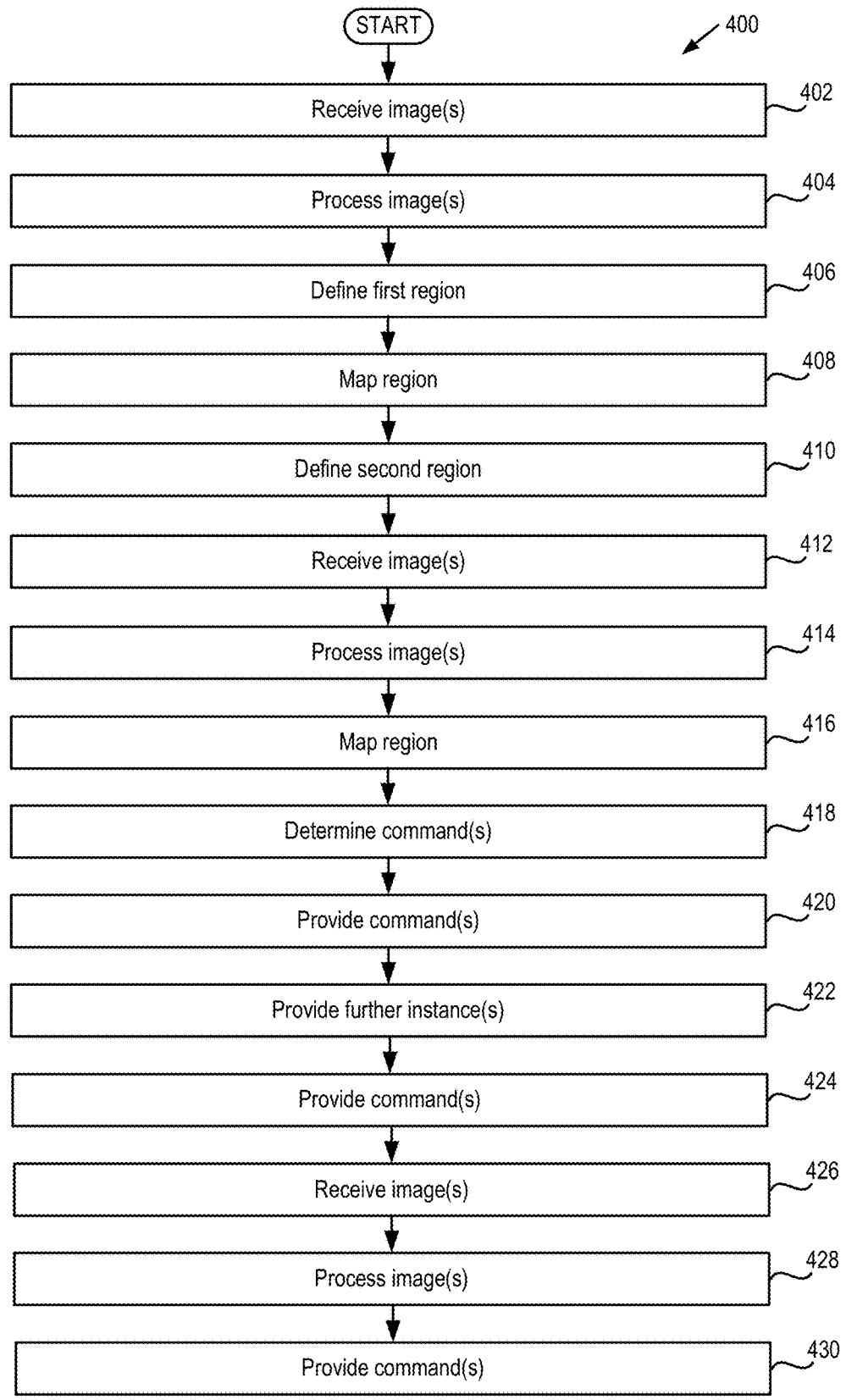
FIG. 4 illustrates an example method for implementing the disclosed embodiments.

Described herein are aspects of various methods including a method/process for gesture recognition and control. Such methods are performed by processing logic that may comprise hardware (circuitry, dedicated logic, etc.), software (such as is run on a computer system or a dedicated machine), or a combination of both. In certain implementations, such methods can be performed by one or more devices, processor(s), machines, etc., including but not limited to those described and/or referenced herein. Various aspects of an exemplary method 400 are shown in FIG. 4 and described herein. It should be understood that, in certain implementations, various operations, steps, etc., of method 400 (and/or any of the other methods/processes described and/or referenced herein) may be performed by one or more of the processors/processing devices, sensors, and/or displays described and/or referenced herein, while in other embodiments some operations/steps of method 400 may be performed other processing device(s), sensor(s), etc. Additionally, in certain implementations one or more operations/steps of the methods/processes described herein may be performed using a distributed computing system including multiple processors, such as processor 120 performing at least one step of method 400, and another processor in a networked device such as a mobile phone performing at least one step of method 400. Furthermore, in some embodiments one or more steps of the described methods/processes may be performed using a cloud computing system.

For simplicity of explanation, methods are depicted and described as a series of acts. However, acts in accordance with this disclosure can occur in various orders and/or concurrently, and with other acts not presented and described herein. Furthermore, not all described/illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 4 illustrates an exemplary process 400 that at least one processor may be configured to perform. For example, at step 402 the at least one processor of gesture recognition device 104 may be configured to receive one or more first images and/or image information from an image sensor 106. In certain implementations, in order to reduce data transfer from the image sensor, various other referenced components (e.g., a processor) may be partially or completely be integrated into image sensor 106. In the case where only partial integration to the image sensor, ISP or image sensor module takes place, image preprocessing, which extracts an object's features related to a predefined object 116 (e.g., a user's hand), may be integrated as part of the image sensor, ISP or image sensor module. A mathematical representation of the video/image and/or the object's features may be transferred for further processing on an external CPU via dedicated wire connection or bus. In the case that the whole system is integrated into image sensor 106, ISP or image sensor module, only a message or command may be sent to an external CPU. Moreover, in some embodiments, if the system incorporates a stereoscopic image sensor, a depth map of the environment may be created by image preprocessing of the video/image in each one of the 2D image sensors or image sensor ISPs and the mathematical representation of the video/image, object's features, and/or other reduced information may be further processed in an external CPU.

"Image information," as used herein, may be one or more of an analog image captured by camera 106, a digital image captured or determined by image sensor 106, subset of the digital or analog image captured by image sensor 106, digital information further processed by an ISP, a mathematical representation or transformation of information associated with data sensed by image sensor 106, frequencies in the image captured by image sensor 106, conceptual information such as presence of objects in the field of view of image sensor 106, information indicative of the state of the image sensor or its parameters when capturing an image (e.g., exposure, frame rate, resolution of the image, color bit resolution, depth resolution, or field of view of the image sensor), information from other sensors when image sensor 106 is capturing an image (e.g. proximity sensor information, or accelerometer information), information describing further processing that took place after an image was captured, illumination conditions when an image is captured, features extracted from a digital image by image sensor 106, or any other information associated with data sensed by image sensor 106. Moreover, "image information" may include information associated with static images, motion images (i.e., video), or any other visual-based data.

At step 404, the at least one processor of gesture recognition device 104 may be configured to process the one or more first images (such as those received at 402). In doing so, a first position of an object can be detected. Such an object can be, for example, one or more fingers, finger(s) in relation to a face and/or body, etc. For example, in some embodiments, the at least one processor of the gesture recognition device 104 may be configured to detect in the image information a touch-free gesture performed by a user. Moreover, in some embodiments, the at least one processor may be configured to detect a location of the gesture in the image information. In some embodiments, prior to, while, or after detecting a touch-free gesture in the image information, face detection and/or eye gaze detection may be performed. For example, a face in image information from image sensor 106 may be detected and a user associated with the detected face may be identified. Information related to the identified user may be retrieved. For example, a mapping associated with the user that relates particular touch-free gestures with particular commands may be retrieved. Eye gaze detection may be used to initiate, or to determine that the user intends, touch-free gesture recognition. For example, if a user is determined to be looking at or near image sensor 106 and/or display device 102 based on detected eye gaze, touch-free gesture recognition may be initiated.

The gesture may be, for example, a gesture performed by the user using predefined object 116 in the viewing space 114. The predefined object 116 may be, for example, one or more hands, one or more fingers, one or more fingertips, one or more other parts of a hand, or one or more band-held objects associated with a user. In some embodiments, detection of the gesture is initiated based on detection of a hand at a predefined location or in a predefined pose. For example, detection of a gesture may be initiated if a band is in a predefined pose and/or in a predefined location with respect to a control boundary. More particularly, for example, detection of a gesture may be initiated if a hand is in an open-handed pose (e.g., all fingers of the hand away from the palm of the hand) or in a first pose (e.g., all fingers of the hand folded over the palm of the hand). Detection of a gesture may also be initiated if, for example, a hand is detected in a predefined pose while the hand is outside of the control boundary (e.g., for a predefined amount of time), or a predefined gesture is performed in relation to the control boundary. Moreover, for example, detection of a gesture may be initiated based on the user location, as captured by image sensor 106 or other sensors. Moreover, for example, detection of a gesture may be initiated based on a detection of another gesture. For example, to detect a "left to right" gesture, the at least one processor may first detect a "waving" gesture.

As used herein, the term "gesture" may refer to, for example, a swiping gesture associated with an object presented on a display, a pinching gesture of two fingers, a pointing gesture towards an object presented on a display, a left-to-right gesture, a right-to-left gesture, an upwards gesture, a downwards gesture, a pushing gesture, a waving gesture, a clapping gesture, a reverse clapping gesture, a gesture of splaying fingers on a hand, a reverse gesture of splaying fingers on a hand, a holding gesture associated with an object presented on a display for a predetermined amount of time, a clicking gesture associated with an object presented on a display, a double clicking gesture, a right clicking gesture, a left clicking gesture, a bottom clicking gesture, a top clicking gesture, a grasping gesture, a gesture towards an object presented on a display from a right side, a gesture towards an object presented on a display from a left side, a gesture passing through an object presented on a display, a blast gesture, a tipping gesture, a clockwise or counterclockwise two-finger grasping gesture over an object presented on a display, a click-drag-release gesture, a gesture sliding an icon such as a volume bar, or any other motion associated with a hand or handheld object. A gesture may be detected in the image information if the processor determines that a particular gesture has been or is being performed by the user.

An object associated with the user may be detected in the image information based on, for example, the contour and/or location of an object in the image information. For example, the at least one processor of the gesture recognition device 104 may access a filter mask associated with object 116 and apply the filter mask to the image information to determine if the object is present in the image information. That is, for example, the location in the image information most correlated to the filter mask may be determined as the location of the object associated with predefined object 116. The at least one processor of the gesture recognition device 104 may be configured, for example, to detect a gesture based on a single location or based on a plurality of locations over time. The at least one processor of the gesture recognition device 104 may also be configured to access a plurality of different filter masks associated with a plurality of different hand poses. Thus, for example, a filter mask from the plurality of different filter masks that has a best correlation to the image information may cause a determination that the hand pose associated with the filter mask is the hand pose of predefined object 116. The at least one processor of gesture recognition device 104 may be configured, for example, to detect a gesture based on a single pose or based on a plurality of poses over time. Moreover, the at least one processor of gesture recognition device 104 may be configured, for example, to detect a gesture based on both one or more determined locations and one or more determined poses. Other techniques for detecting real-world objects in image information (e.g., edge matching, greyscale matching, gradient matching, and other image feature based methods) may also be used to detect a gesture in the image information.

A "gesture location" as used herein; may refer to one or a plurality of locations associated with a gesture. For example, a gesture location may be a location of an object or gesture in the image information as captured by the image sensor, a location of an object or gesture in the image information in relation to one or more control boundaries, a location of an object or gesture in the 3D space in front of the user, a location of an object or gesture in relation to a device or physical dimension of a device, or a location of an object or gesture in relation to the user's body or part of the user's body such as the user's head. For example, a gesture location may include more than one location. Each location may include one or more of a starting location of a gesture, intermediate locations of a gesture, and an ending location of a gesture.

In other embodiments, the location of the object associated with object 116 in the image information may be used to determine a corresponding location on display device 102 (including, for example, a virtual location on display device 102 that is outside the boundaries of display device 102), and the corresponding location on display device 102 may be used as the detected location of the gesture in the image information. For example, the gesture may be used to control movement of a cursor, and a gesture associated with a control boundary may be initiated when the cursor is brought to an edge or corner of the control boundary. Thus, for example, a user may extend a finger in front of display device 102, and the processor may recognize the fingertip, enabling the user to control a cursor. The user may then move the fingertip to the right, for example, until the cursor reaches the right edge of the display. When the cursor reaches the right edge of the display, a visual indication may be displayed indicating to the user that a gesture associated with the right edge is enabled. When the user then performs a gesture to the left, the gesture detected by the processor may be associated with the right edge of the device. FIGS. 3A-3H depict exemplary representations of hand poses that may be used during a gesture, and may affect a type of gesture that is detected and/or action that is caused by a processor. Each differing combination of motion path and gesture may result in a differing action. In some embodiments, the at least one processor is also configured to cause an action associated with the detected gesture and the detected gesture location. An action caused by a processor may be, for example, generation of a message or execution of a command associated with the gesture. A message or command may be, for example, addressed to one or more operating systems, one or more services, one or more applications, one or more devices, one or more remote applications, one or more remote services, or one or more remote devices.

By way of illustration, the described technologies can enable a user to interact with a display device such as a smart TV. As shown in FIG. 2, the device may be include a gesture recognition device 104 (which includes an image sensor, as shown in FIG. 1) which may be mounted on the display device 102. A user 118 may point at a location 20 on the display device 102 and utter a voice command ("play album") 40 which may relate, reference, and/or be addressed to an image displayed on the display device 102, such as in relation to the location on the display at which the user is pointing. For example, several music albums may be represented by icons 21 presented on the display device 102. The user 118 can point with a pointing element such as finger 116 at one of the icons and say "play album," and, upon identifying the referenced hand gesture within image(s) captured by the sensor and/or the voice command within the perceived audio signals (as described herein), the processor then sends a command to the device 102 corresponding to the gesture/verbal instruction. In this example, the pointing may be direct pointing using a pointing element, or may be indirect pointing that utilizes a cursor displayed on the display device 102.

As noted above, the system may also receive information from an image sensor, which, in certain implementations, may be positioned adjacent to device 102 and configured to obtain images of a three-dimensional (3-D) viewing space 114. It should also be noted that the gesture recognition device 104 and/or image sensor can be positioned adjacent to the device 102 (e.g., as shown in FIGS. 1 and 2), while in alternative embodiments, the gesture recognition device and/or image sensor may be incorporated into the device 102 or even located away from the device.

For example, in certain implementations, in order to reduce data transfer from the sensor to an embedded device motherboard, processor, application processor, GPU, a processor controlled by the application processor, or any other processor, the gesture recognition system may be partially or completely integrated into the sensor. In the case where only partial integration to the sensor, ISP or sensor module takes place, image preprocessing, which extracts an object's features related to the predefined object, may be integrated as part of the sensor, ISP or sensor module. A mathematical representation of the video/image and/or the object's features may be transferred for further processing on an external CPU via dedicated wire connection or bus. In the case that the whole system is integrated into the sensor, ISP or sensor module, a message or command (including, for example, the messages and commands referenced herein)

may be sent to an external CPU. Moreover, in some embodiments, if the system incorporates a stereoscopic image sensor, a depth map of the environment may be created by image preprocessing of the video/image in the 2D image sensors or image sensor ISPs and the mathematical representation of the video/image, object's features, and/or other reduced information may be further processed in an external CPU.

The processor or processing unit 120 (such as is depicted in FIG. 1) of gesture recognition device 104 and/or device 102 may be configured to present display information, such as icon(s) 21 on a display 124 towards which the user 118 may point the finger/fingertip 116. The processing unit may be further configured to indicate an output (e.g., an indicator) on the display 124 corresponding to the location pointed at by the user. For example, as shown in FIG. 2, the user 118 may point finger 116 at the display information (icon 21) as depicted on the display 124. In this example, the processing unit may determine that the user is pointing at icon 21 based on a determination that the user is pointing at specific coordinates on the display 124 ((x, y) or (x, y, z) in case of a 3-D display) that correspond to the icon. As described in detail above with respect to FIG. 1, the coordinates towards which the user is pointing can be determined based on the location of the finger/fingertip 116 with respect to the icon (as reflected by ray 31 as shown in FIG. 2) and, in certain implementations, based on the location of the user's eye and a determination of a viewing ray from the user's eye towards the icon (as reflected by ray 32 as shown in FIG. 2), such as using eye tracking techniques to determine the eye gaze of the user. For example, the processor can process/analyze images in order to determine/identify the user's eye gaze which may reflect, for example, the angle of the gaze and/or the region of the display 102 and/or the content displayed thereon—e.g., an application, webpage, document, etc.— that the user can be determined to be directing his/her eyes at (and/or information corresponding to such an eye gaze). For example, the referenced eye gaze may be computed based on/in view of the positions of the user's pupils relative to one or more areas/landmarks on the user's face. As shown in FIG. 2, the user's eye gaze may be defined as a ray 32 extending from the user's face (e.g., towards device 102), reflecting the direction in which the user is looking.

It should be understood that a gesturing location (such as the location of icon 21 at which the user is gesturing as depicted in FIG. 2) may be a representation such as a mathematical representation associated with a location on the display 124, which can be defined at some point by the system as the location on which the user points at. As noted, the gesturing location can include a specific coordinate on the display (x, y) or (x, y, z, in case of a 3-D display). The gesturing location can include an area or location on the display 124 (e.g., candidate plane). In addition, the gesturing location can be a defined as probability function associated with a location on the display (such as a 3-D Gaussian function). The gesturing location can be associated with a set of addition figures, which describes the quality of detection, such as probability indication of how accurate the estimation of the location on the display 124 of the gesturing location.

In case of a smart-glass, e.g., a wearable glass that include the capability to present to the user 118 digital information, the gesturing location may be defined as the location of a virtual plane, the plane on which the user perceived to see the digital information that is presented by the smart-glass display.

Display information may include static images, animated images, interactive objects (such as icons), videos, and/or any visual representation of information. Display information can be displayed by any method of display as described above and may include flat displays, curved displays, projectors, transparent displays, such as one used in wearable glasses, and/or displays that projects directly to or in directly to the user's eyes or pupils.

Indication or feedback of the pointed-at icon (e.g., icon 21 of FIG. 2) may be provided by, for example, one or more of a visual indication, an audio indication, a tactile indication, an ultrasonic indication, and a haptic indication. Displaying a visual indication may include, for example, displaying an icon on the display 10, changing an icon on the display, changing a color of an icon on the display (such as is depicted in FIG. 2), displaying an indication light, displaying highlighting, shadowing or other effect, moving an indicator on a display, providing a directional vibration indication, and/or providing an air tactile indication. A visual indicator may appear on top (or in front of) other images or video appearing on the display. A visual indicator, such as icon on the display selected by the user, may be collinear with the user's eye and the fingertip lying on a common viewing ray (or line of sight). As used herein, and for reasons described later in greater detail, the term "user's eye" is a short-hand phrase defining a location or area on the user's face associated with a line of sight. Thus, as used herein, the term "user's eye" encompasses the pupil of either eye or other eye feature, a location of the user face between the eyes, or a location on the user's face associated with at least one of the user's eyes, or some other anatomical feature on the face that might be correlated to a sight line. This notion is sometimes also referred to as a "virtual eye".

An icon is an exemplary graphical element that may be displayed on the display 124 and selected by a user 118. In addition to icons, graphical elements may also include, for example, objects displayed within a displayed image and/or movie, text displayed on the display or within a displayed file, and objects displayed within an interactive game. Throughout this description, the terms "icon" and "graphical element" are used broadly to include any displayed information.

In some embodiments, the gesture recognition device 104 is configured. Configuration of the gesture recognition device 104 may be performed, for example, by connecting gesture recognition device 104 to a device such as a computer (e.g., a PC), smartphone, or TV, using a USB, WiFi, Bluetooth, HDMI, or other wired or wireless connection, and transferring executable computer program code and/or other data to the memory of gesture recognition device 104. Configuration may include, for example, configuring which devices are to be controlled (including, for example, make and model). For example, configuring a known make and model of a device may include transferring IR codes to the memory of gesture recognition device 104. If make and model information of devices to be controlled are not known, gesture recognition device 104 may be taught new IR codes. For example, gesture recognition device 104 may include an IR receiver (in some embodiments, image sensor 106 may be used as an IR receiver). A user may teach gesture recognition device 104 new IR codes by causing an input device (e.g., an IR remote control) to emit IR codes, gesture recognition device 104 may detect emitted IR codes, receive an indication of their function (e.g., change volume or change channel) from the user or from a device, and associate the functionality with the IR code.

Configuration of gesture recognition device 104 may also include mapping gestures to actions. For example, a gesture including raising an open palm, closing the palm to a fist, and then raising or lowering the fist, may be associated with an IR code that, if detected by a device, causes display device 102 to raise or lower its volume. In some embodiments, gesture recognition device 104 may be trained to associate a plurality of gestures with a plurality of different actions. This training may be performed, for example, generically for all users or a set of users, or may be performed by individual users.

Figure 5:
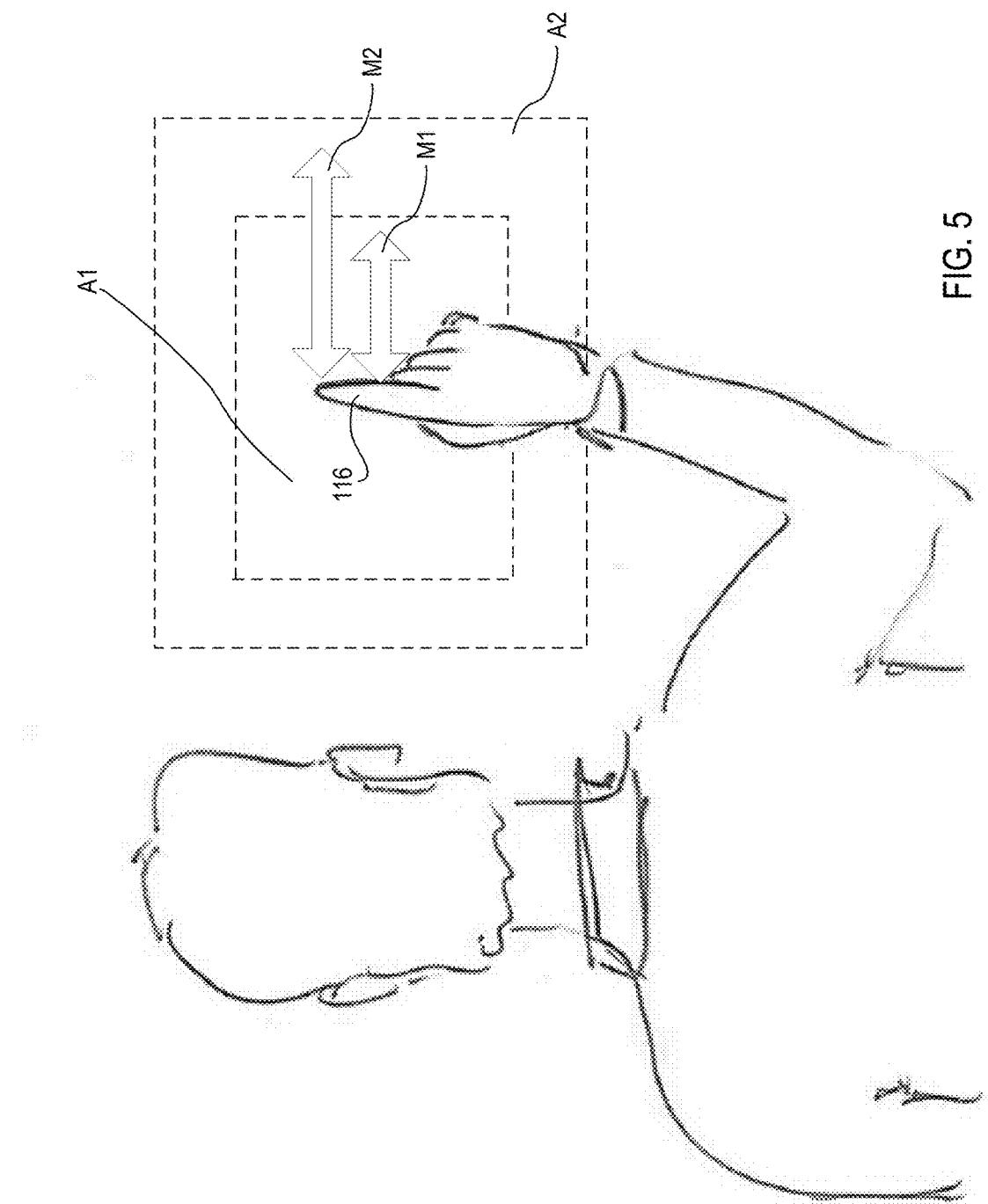
FIG. 5 illustrates another example implementation of the disclosed embodiments.

At step 406, the at least one processor (e.g., of gesture recognition device 104) may be configured to define a first navigation region. In certain implementations, such a navigation region can be defined in relation to the position of the object. For example, as shown in FIG. 5, a first region in space ("A1"), can be identified/defined (e.g., by a processor) within/with respect to images (e.g., of the user) captured or obtained by the image sensor. The processor can be configured to search for/identify the presence of the pointing element 116 within region A1, and to display, project, and/or depict the cursor (e.g., on the screen/surface) or otherwise perform various navigation functions upon determining that the pointing element is present within region A1. In certain implementations, the referenced region (A1) can be defined or determined based on a gesture performed by the user. For example, upon determining that the user has raised his/her hand 116 (e.g., from another position), the region (A1) can be identified/defined around the position of the referenced raised hand 116.

At step 408, the at least one processor (e.g., of gesture recognition device 104) may be configured to map the first navigation region to a first region of a user interface. Such a region of a user interface can be, for example, a window, menu, etc. (or any other such interface element) of a GUI being presented on a display device. In doing so, motion of the object 116 detected within the first navigation region (e.g., region A1 as depicted in FIG. 5) can be processed and/or otherwise determined to correspond to instructions/commands associated with operations (e.g., navigation operations) performed within the corresponding region of the user interface. Such functionality can improve the precision/accuracy of the user's interaction/navigation within such interface(s) by enabling the user's gestures (e.g., those performed within region A1, as shown in FIG. 5) to be associated with a particular region of the user interface (e.g., a window, menu, etc.).

At step 410, the at least one processor (e.g., of gesture recognition device 104) may be configured to define a second navigation region, e.g., in relation to the first navigation region. In certain implementations, such a second navigation region may surround some or all of the first navigation region (that is, the navigation region defined at 406). For example, FIG. 5 depicts navigation region "A2" which surrounds region "A1."

At step 412, the at least one processor (e.g., of gesture recognition device 104) may be configured to receive one or more second images from the image sensor, such as in a manner described herein.

At step 414, the at least one processor (e.g., of gesture recognition device 104) may be configured to process the one or more second images (e.g., those received at 412). In doing so, a transition of an object (e.g., object 116 as shown in FIG. 5) from the first navigation region (e.g., region A1) to the second navigation region (e.g., region A2) can be detected. That is, as shown in FIG. 5, various images can be processed to detect the motion (e.g., motion paths M1 and M2, as shown in FIG. 5) of an object 116 (e.g. the hand of the user) within and/or in between various navigation region(s) (A1, A2). For example, as shown in FIG. 5 with respect to motion path "M1," the received image(s) can be process to detect that the user has moved his/her hand within region A1. In certain implementations, such motion of the object (e.g., motion within the first navigation region) may correspond to navigation operation(s) performed at a first speed. In contrast, upon determining (based on a processing of the received image(s)) that the user has moved his/her hand 116 from region A1 to region A2 (e.g., as shown in FIG. 5 with respect to motion "M2"), and that the position of the object is maintained within the second navigation region. such motion of the object may correspond to navigation operation(s) (e.g., scrolling operations) at a second speed, e.g., a speed that is faster than the first speed (i.e., the speed to the same operations performed with respect to motion M1).

Figure 6:
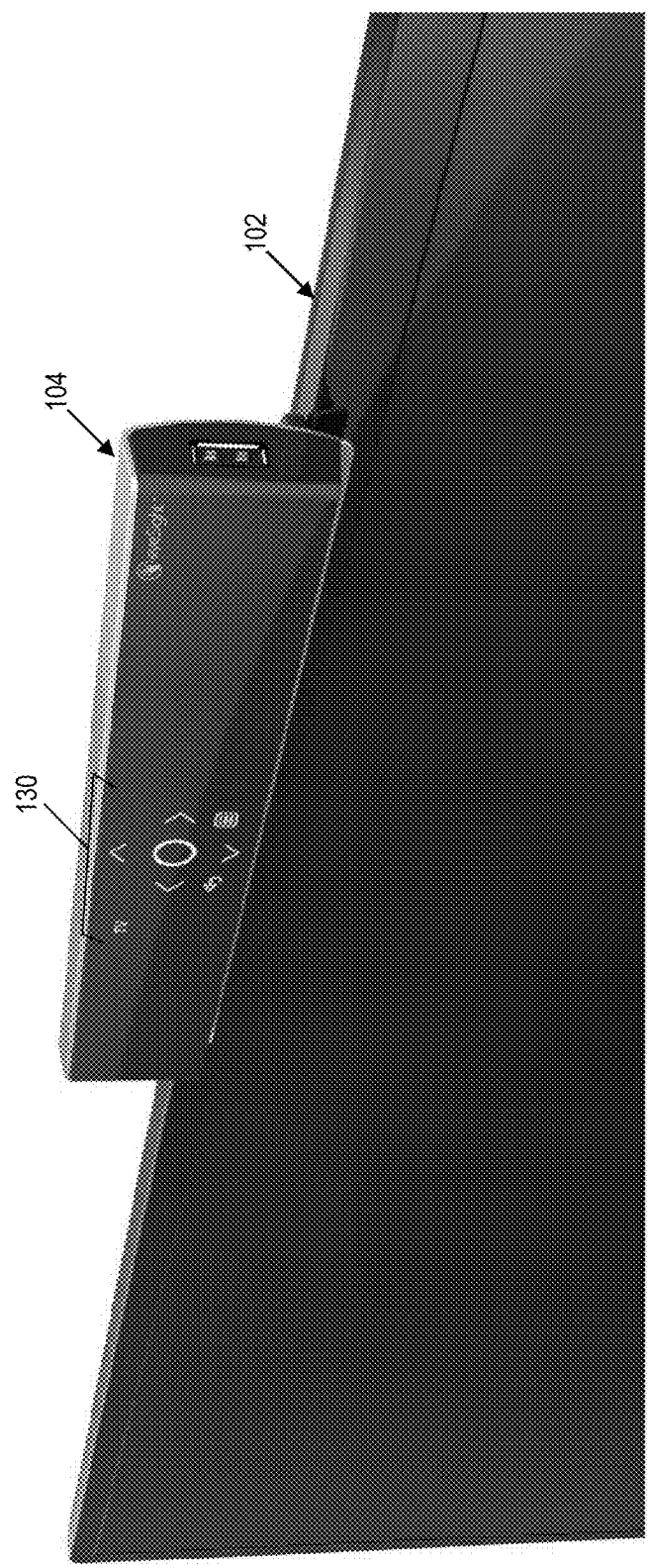
FIG. 6 illustrates another example implementation of the disclosed embodiments
Figure 7:
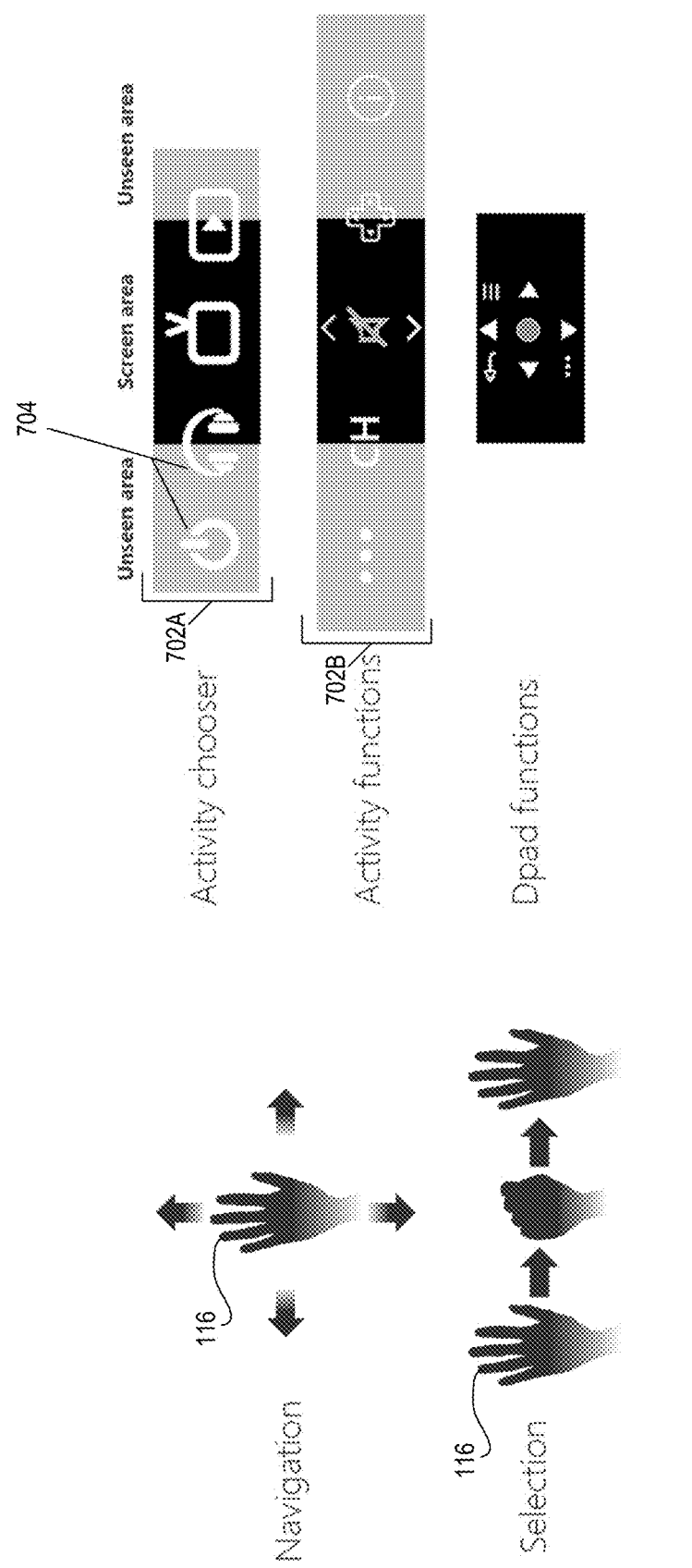
FIG. 7 illustrates another example implementation of the disclosed embodiments.

By way of illustration, FIG. 6 depicts further aspects of gesture recognition device 104. As shown in FIG. 6, in certain implementations gesture recognition device 104 can further include a display element 130, such as an LCD, LED, etc., panel which can depict information such as dynamic menus or other interface elements that a user may navigate through (e.g., using gestures, etc.) in order to select specific commands, operations, etc., to be transmitted/provided (e.g., by device 104) to display device 102, other devices, etc. For example, FIG. 7 depicts certain exemplary gestures. As shown in FIG. 7, gesture recognition device 104 may include various menus 702A-B, each of which can include multiple icons 704 (or any other such indicators, e.g., letters, numbers, etc.) (or which may correspond to directional functions ('dpad'), e.g. 'up,' 'down,' 'left,' 'right,' etc., operations). Each menu can, for example, correspond to a different set of functions (e.g., commands, operations, etc., associated with a different device, e.g., a TV, STB, streaming player, stereo, etc.). Moreover, each icon 704 can, for example, correspond to a respective command/instruction (e.g., an IR code). It should be understood that, as shown in FIGS. 6 and 7, display element 130 may be configured to display only a subset of an entire menu 702 (within the 'screen area' of the display element) at a given time. As also shown in FIG. 7, the motion of object 116 (e.g., the hand of a user) can be processed to determine the navigation of the user through such menu(s). For example, as shown in FIG. 7, the user may navigate (e.g., scroll) between/through such menu(s) by moving his/her hand in a particular direction (e.g., up, down, left, right, etc.) and/or by performing a gesture or sequence of gestures (e.g., a 'selection' gesture as shown in FIG. 7, corresponding to the closing of an open hand, followed by the opening of such a closed hand, which can correspond to the selection of the command/operation within the referenced menus currently shown on display element 130). Accordingly, it can be appreciated that, for example, when a user is navigating (e.g., scrolling) within and/or in between the referenced menu(s) 702 (or menus displayed on device 102 that the user is interacting with/controlling via device 104, e.g., on screen menus of a TV, STB, streaming media player, etc.), when navigating in a manner that corresponds to motion 'M1' (as shown in FIG. 5) (e.g., moving hand 116 from left to right within navigation region 'A1'), the corresponding operation(s)/command(s) (e.g., scrolling through icons within a menu 702) can be performed at a first (e.g. slower) speed. In contrast, when navigating in a manner that corresponds to motion 'M2' (as shown in FIG. 5) (e.g., moving hand 116 from left to right from navigation region 'A1' into navigation region M2, and maintaining hand 116 within navigation region M2), the corresponding operation(s)/command(s) (e.g., scrolling through icons within a menu 702) can be performed at a second (e.g. faster) speed.

Figure 8:
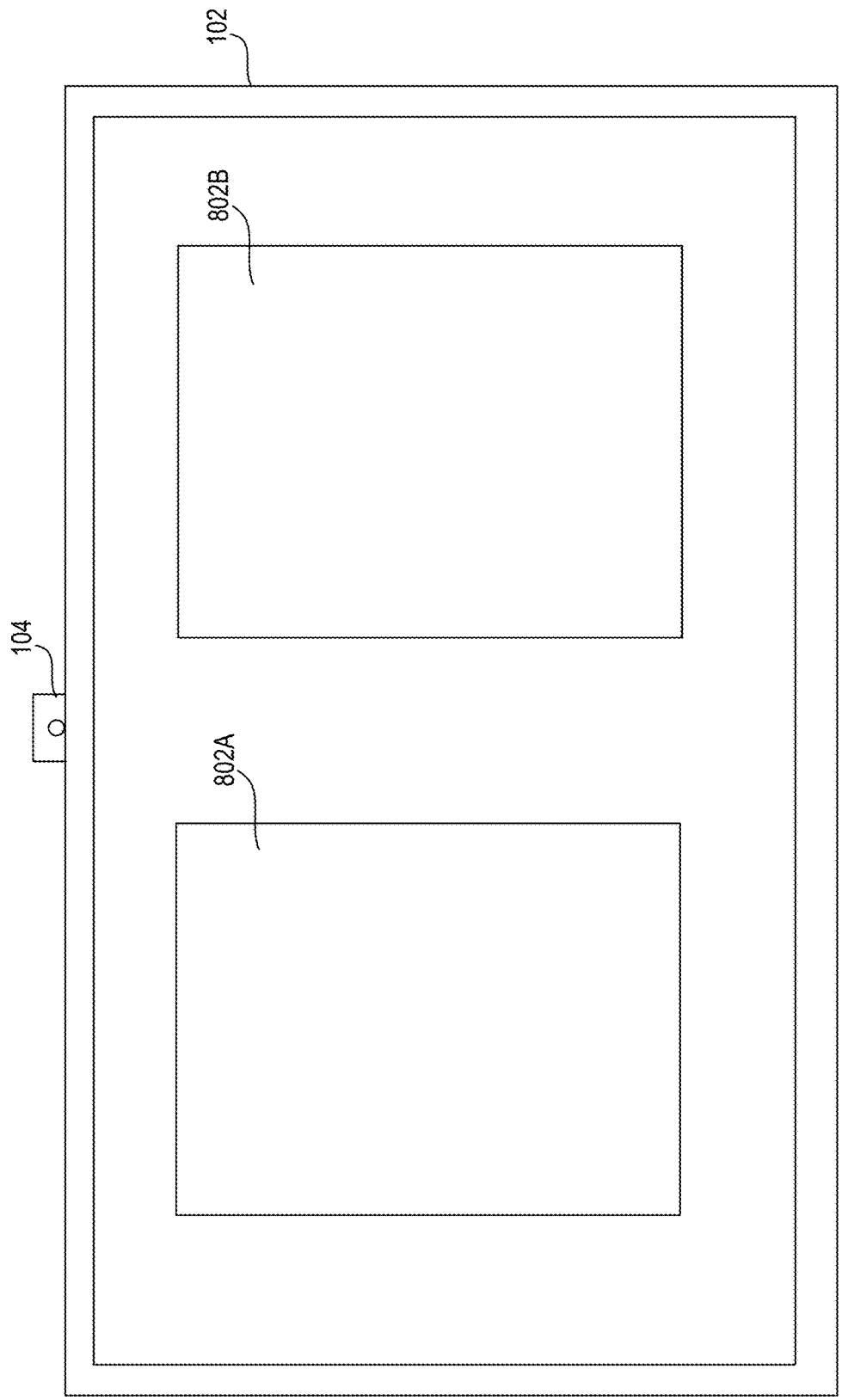
FIG. 8 illustrates another example implementation of the disclosed embodiments.

At step 416, the at least one processor (e.g., of gesture recognition device 104) may be configured to map the first navigation region to a second region of the user interface, such as in response to a detection of the transition of the object from the first navigation region to the second navigation region. For example, FIG. 8 depicts a scenario in which a GUI displayed on display device 102 includes two windows 802A-B (and/or any other such GUI elements). Accordingly, in a scenario in which a user is initially interacting with window 802A, upon determining that the user performed gesture(s) that correspond to motion 'M2' (as shown in FIG. 5) (e.g., moving hand 116 from left to right from navigation region 'A1' into navigation region M2, and maintaining hand 116 within navigation region M2), a command and/or instruction can be provided, reflecting that window 802B is to be the 'selected' region within which the user wishes to interact. Accordingly, subsequent gestures performed within region A1 can then be associated within window 802B (in lieu of window 802A). In doing so, motion M2 can enable a transition whereby the user selects another region within a user interface with which to interact. Upon selecting such a user-interface region (e.g., by performing motion M2), subsequent gestures that are performed within the same region (A1) can be associated with the selected user-interface region.

At step 418, the at least one processor (e.g., of gesture recognition device 104) may be configured to determine a first command. In certain implementations, such a command (e.g., a remote control code) may be associated with a particular device (e.g., a TV, STB, streaming media player, stereo, etc.). Moreover, in certain implementations such a command may correspond to the transition of the object from the first navigation region to the second navigation region (e.g., a scrolling command which navigates through one or more menus, icons, etc., such as is depicted in FIG. 7 and described herein). In some embodiments, the at least one processor of the gesture recognition device 104 may be configured to determine a corresponding remote control code associated with a detected touch-free gesture. For example, user 118 may perform a gesture including raising an open palm, closing the palm to a fist, and then lowering the fist. Gesture recognition device 104 may detect the gesture in the manner described above and determine that the detected gesture is associated with, for example, a remote control code.

At step 420, the at least one processor (e.g., of gesture recognition device 104) may be configured to provide, transmit, etc. the determined first command to the device. Moreover, in certain implementations, a presently selected content delivery device can be determined. Additionally, in certain implementations, one or more commands that correspond to the transition (e.g., the transition of a user's hand from one navigation region to another, and/or any other such movement, gesture, etc.) with respect to the presently selected content delivery device can be identified. For example, as described herein, it can be appreciated that the described technologies can be configured to provide commands, instructions, etc. to multiple devices (e.g., TV, STB, streaming media player, stereo, etc.). It can be further appreciated that such devices may have certain instructions in common (e.g., channel up/down, volume up/down, fast forward, etc.), though each instruction may have a unique remote-control code for each respective device. Accordingly, while the user may utilize a universal or 'master' icon/menu to perform certain operations (e.g., channel up/down, volume up/down, fast forward, etc.), the described technologies can identify the appropriate (e.g., presently and/or most recently selected content delivery device) and provide one or more identified commands that correspond to such a content delivery device. In doing so, the user can interact with multiple content delivery devices (e.g., TV, STB, streaming media player, stereo, etc.) using a single set of gestures/interfaces and the described technologies can identify and provide the appropriate corresponding commands/instructions to the appropriate device(s), based on the context.

In some embodiments, the at least one processor of the gesture recognition device 104 may be configured to transmit a determined code to a device. In certain implementations, gesture recognition device 104 may include an IR LED 108, as shown in FIG. 1. IR LED 108 may be used, for example, to emit an IR code in response to a detected gesture. In some embodiments, in order to, for example, extend the range of IR LED 108, an IR repeater/extender 110 may detect and re-transmit IR codes. An IR repeater/extender 110 may be used, for example, to control devices that are not in a line of sight of gesture recognition device 104.

A plurality of devices may detect a transmitted IR code. For example, display device 102 and audio speaker 112 may both detect an IR code emitted by IR LED 108 and/or IR repeater/extender 110. Display device 102 and audio speaker 112 may be configured to determine whether a detected IR code is usable. For example, an IR code may be usable by display device 102 but not audio speaker 112; conversely, an IR code may be usable by audio speaker 112 but not display device 102. Thus, for example, user 118 may perform a gesture including raising an open palm, closing the palm to a fist, and then lowering the fist. Gesture recognition device 104 may detect the gesture in the manner described above, determine that the detected gesture is associated with a particular action such as lowering volume, and emit an IR code associated with the action (e.g., an IR code to audio speaker 112 to lower volume by a predetermined amount). Speaker 112 may, for example, determine to lower volume based on the IR code, and display device 102 may not perform any action based on the IR code.

While IR communication is discussed above, gesture recognition device 104 may communicate with other devices using other means. For example, gesture recognition device 104 may transmit data (e.g., data representative of an action associated with a detected gesture) to a device that is not configured for control by touch-free gestures using, for example, Bluetooth, WiFi, WLAN, Cellular, USB, HDMI, Ethernet, NFC, or any other known wired or wireless communication.

At step 422, the at least one processor (e.g., of gesture recognition device 104) may be configured to provide one or more further instances of the one or more first commands. In certain implementations, such further instances of the first command can be provided based on a determination that the position of the object is maintained within the second navigation region. For example, as shown in FIG. 5, in a scenario in which a user is scrolling through a menu, etc. (e.g., from left to right), when performing motion M2 (and maintaining the position of hand 116 within region A2), gesture recognition device can continue to provide multiple instances of a 'scroll right' instruction (e.g., until the user removes his/her hand from region A2).

At step 424, the at least one processor (e.g., of gesture recognition device 104) may be configured to provide one or more second commands that correspond to the position of the object being maintained within the second navigation region. In certain implementations, such further instances of the first command can be provided based on a determination that the position of the object is maintained within the second navigation region. For example, as shown in FIG. 5, in a scenario in which a user is scrolling through a menu, etc. (e.g., from left to right), when performing motion M2 (and maintaining the position of hand 116 within region A2), gesture recognition device can continue to provide multiple instances of a 'scroll right' instruction (e.g., until the user removes his/her hand from region A2).

At step 426, the at least one processor (e.g., of gesture recognition device 104) may be configured to receive one or more third images from the at least one image sensor, such as in a manner described herein.

At step 428, the at least one processor (e.g., of gesture recognition device 104) may be configured to process the one or more third images to detect a transition of the object from the second navigation region to the first navigation region. For example, as shown in FIG. 5, the user may perform motion M2 whereby the user moves hand 116 from region A1 to A2, and then returns the hand from region A2 back to region A1.

At step 430, the at least one processor (e.g., of gesture recognition device 104) may be configured to provide one or more second commands that correspond to the transition of the object from the second navigation region to the first navigation region. In certain implementations, such second commands can include a command to stop a navigation operation corresponding to the one or more first commands. For example, as noted above, motion M2 (as shown in FIG. 5) can correspond to scrolling (or fast scrolling) operation(s). Accordingly, upon returning hand 116 to region A1, a 'stop scrolling' command can be provided (e.g., in lieu of a 'scroll left' operation). In doing to, the transition of the hand from one navigation region back to the previous navigation region can be determined to indicate a completion of the previous operation (e.g., scrolling) (as opposed to indicating, for example, an instruction to navigate/scroll back towards the opposite direction of the scrolling).

It should also be noted that certain gestures may be identified based on the performance/presence of such gestures in relation to one or more body parts of the user. For example a 'shhh' gesture (corresponding to a silence/mute instruction) can be identified based on a the placement of the finger of the user across the lips of the user (e.g., perpendicular to the user's lips).

Additionally, in certain implementations, gesture recognition device 104 and/or the referenced image sensor(s) 106 can be configured to identify the presence of various user(s), e.g., using various facial recognition, speech recognition, and/or any other such identity recognition and/or biometric techniques. Such identification techniques can be utilized in any number of ways. For example, in certain implementations the identification of a particular user can enable the described technologies to configure the operation of gesture recognition device 104 and/or other devices in accordance with the preferences, history, rules, etc., associated with such a user (e.g., retrieving the user's favorite programs when they walk into a room, tuning to the user's favorite channel, preventing an identified child user from accessing adult content, preventing an identified child user from viewing more content than is authorized by a parent, etc.).

Additionally, the identification of the presence of user(s) by the gesture recognition device can enable further interactions in relation to content being viewed by such users. For example, while viewing television programming associated with various contests/competitions in which viewers can vote, the described technologies can enable identified viewers to vote (e.g., by providing a specific gesture, e.g., raising a hand, at a determined interval during the program).

Figure 9:
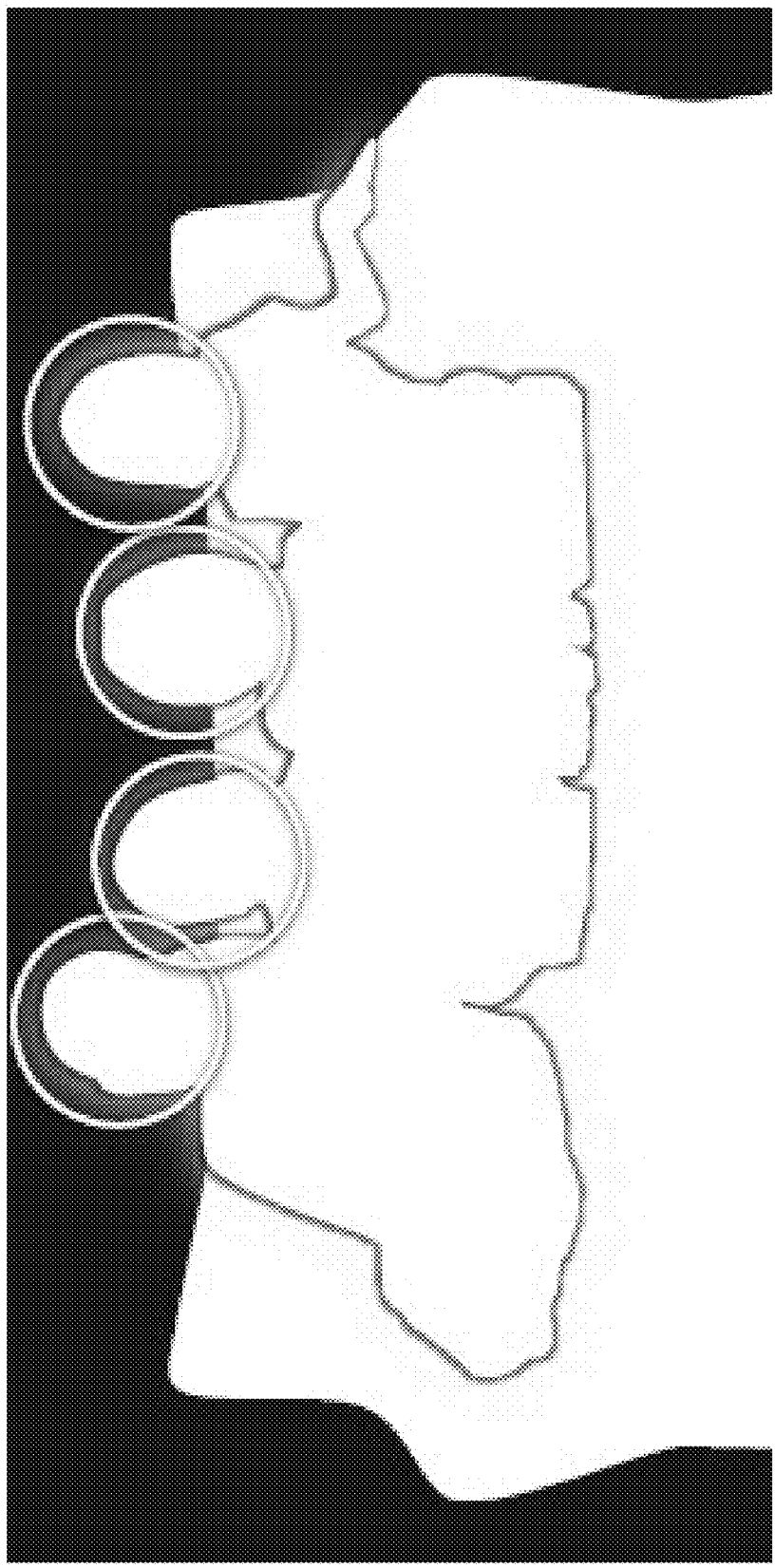
FIG. 9 illustrates another example implementation of the disclosed embodiments.

The described gesture recognition device can also enable the collection of viewership data and related information, e.g., with respect to broadcast television content. For example, FIG. 9 depicts an exemplary image captured by gesture recognition device 104 of four users sitting and watching television (the face of each user had been identified and is shown with a ring surrounding it). It can be appreciated that while existing television rating technologies may enable the tracking of whether a television is tuned to a particular channel, such technologies cannot determine how many people are watching a particular television, and/or whether they are actually watching the television (as opposed to sleeping, in another room, etc.). In contrast, the described technologies can enable the identification of the number of users watching a particular program, etc., at a given time, the identity of and/or demographic information associated with such users, when such users are/are not engaged by the program (e.g., when did/didn't they leave the room, fall asleep, etc.). In doing so, more precise rating/engagement data can be collected and targeted content (e.g., suggested content, advertisements, etc.) can be more effectively provided.

Moreover, the described technologies can enable automated/automatic control of various devices. For example, in certain implementations various media presentations can be controlled/modified based on a user's activities (as determined by gesture recognition device 104). For example, if a user is watching a television program, movie, etc., and is then determined to have left the room, the program, movie, etc., can be paused (and resumed once the user is determined to have returned). By way of further example, if a user is listening to music, and is then determined to have left the room, the volume of the playing music can be raised (or the music can be directed to another speaker, e.g., closer to where the user is determined to be) (and the previous settings can be restored once the user is determined to have returned).

The described technologies can also be configured to incentivize or encourage a user to perform more physical activity. For example, gesture recognition device 104 can be configured to prevent a user from watching more than a certain amount of television at a time without taking a break for physical activity.

It can be appreciated that, in certain implementations multiple users may be present at a given time (each of whom may wish to control gesture recognition device 104). Accordingly, in certain implementations certain priorities can be defined which reflect which user (when several are present) can control the device. In certain implementations, the owner/administrator of the device (who can be identified using facial recognition techniques, etc.) can be provided with authority to control the device (e.g., in lieu of other users). In other implementations rule(s) can be defined which dictate which user(s) may control the device (e.g., certain users at certain times, for certain time durations, etc.). In other implementations, certain regions of the field of view of the device (e.g., the center region) can be prioritized, such that users in those region(s) are prioritized (with respect to controlling the device) over users in other regions.

It should be understood that while the described technologies do reference the capture of certain identifying information/characteristics associated with the referenced users, the described technologies can be further configured to ensure that identifying information is not shared/disseminated and that the privacy of such users is maintained. For example, the captured video/images referenced herein can be maintained locally on the device, and thus not shared with outside services. Rather, in such implementations, only anonymized information may be shared or transmitted. Additionally, in certain implementations users may be provided with the ability to opt-out or otherwise not utilize various functions which utilized personal information. In doing so, the privacy of users and their personal information can be maintained.

It should also be noted that while the technologies described herein are illustrated primarily with respect to content display and gesture control, the described technologies can also be implemented in any number of additional or alternative settings or contexts and towards any number of additional objectives. Moreover, while many of the foregoing examples illustrate scenarios pertaining to the control of content delivery devices (e.g., TVs, STBs, etc.), the described technologies are not so limited. Rather, in certain implementations the described technologies can also be configured to control or otherwise configure various other devices, such as 'smart home' devices (e.g., turning lights on/off, controlling the temperature of a room, etc., based on a user's gesture(s), whether they are/aren't in the room, and/or the activities the user is performing while in the room, etc.) and/or any other such devices capable of being controlled or configured.

Figure 10:
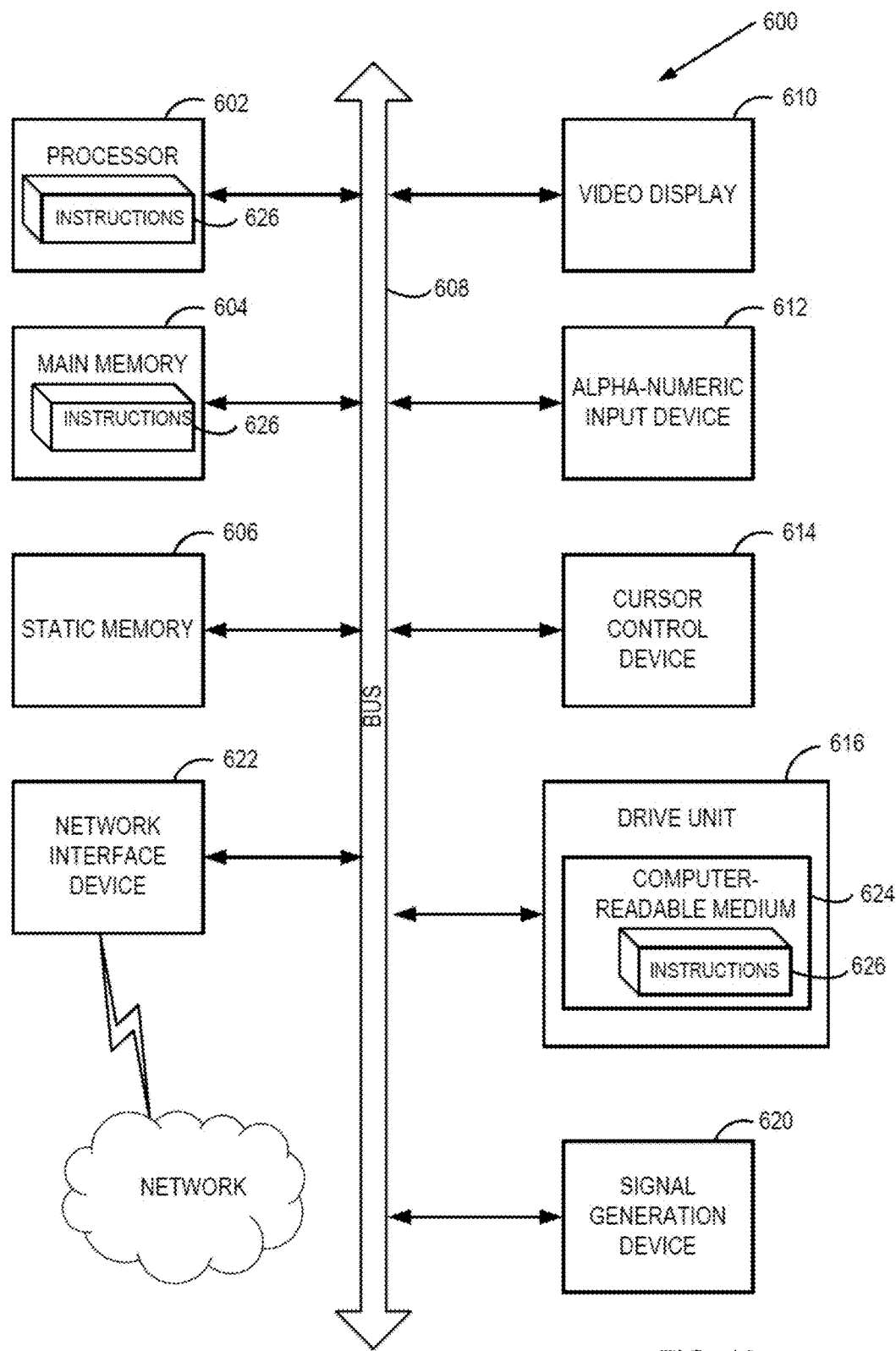
FIG. 10 illustrates another example implementation of the disclosed embodiments.

FIG. 10 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a computing device integrated within and/or in communication with a vehicle, a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more processing devices such as an application specific integrated circuit (ASIC), a field programmable gate array (FPGA), a digital signal processor (DSP), network processor, or the like. The processor 602 is configured to execute instructions 626 for performing the operations discussed herein.

The computer system 600 may further include a network interface device 622. The computer system 600 also may include a video display unit 610 (e.g., a touchscreen, liquid crystal display (LCD), or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by server machine 120, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "providing," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. A computer program to activate or configure a computing device accordingly may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The present disclosure is not described with reference to any particular programming language. It will be appreciated that a variety of programming languages may be used to implement the teachings of the disclosure as described herein.

As used herein, the phrase "for example," "such as," "for instance," and variants thereof describe non-limiting embodiments of the presently disclosed subject matter. Reference in the specification to "one case," "some cases," "other cases," or variants thereof means that a particular feature, structure or characteristic described in connection with the embodiment(s) is included in at least one embodiment of the presently disclosed subject matter. Thus the appearance of the phrase "one case," "some cases," "other cases," or variants thereof does not necessarily refer to the same embodiment(s).

Certain features which, for clarity, are described in this specification in the context of separate embodiments, may also be provided in combination in a single embodiment. Conversely, various features which are described in the context of a single embodiment, may also be provided in multiple embodiments separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A system comprising:
   at least one processor configured to:
      receive one or more first images from an image sensor;
      process the one or more first images to detect a first position of an object;
      define a first region in relation to the position of the object, wherein motion of the object detected within the first region corresponds to one or more operations at a first speed;
      define a second region in relation to the first region, wherein motion of the object detected within the second region corresponds to one or more operations at a second speed that is faster than the first speed;
      receive one or more second images from the image sensor;
      process the one or more second images to detect a transition of the object from the first region to the second region;
      determine a first command associated with a device and that corresponds to the transition of the object from the first region to the second region; and
      provide the determined first command to the device.

2. The system of claim 1, wherein to process the one or more second images the processor is further configured to process the one or more images to determine that the position of the object is maintained within the second region.

3. The system of claim 2, wherein the at least one processor is further configured to provide one or more further instances of the first command based on a determination that the position of the object is maintained within the second region.

4. The system of claim 2, wherein the at least one processor is further configured to provide a second command that corresponds to the position of the object being maintained within the second region.

5. The system of claim 1, wherein the at least one processor is further configured to:
   receive one or more third images from the image sensor;
   process the one or more third images to detect a transition of the object from the second region to the first region; and
   provide a second command that correspond to the transition of the object from the second region to the first region.

6. The system of claim 1, wherein the at least one processor is further configured to:
   map the first region to a first region of a user interface;
   wherein motion of the object detected within the first region corresponds to one or more operations performed within the first region of the user interface.

7. The system of claim 6, wherein the at least one processor is further configured to:
   map the first region to a second region of the user interface in response to a detection of the transition of the object from the first region to the second region;
   wherein motion of the object detected within the first region corresponds to one or more operations performed within the second region of the user interface.

8. The system of claim 1, wherein to provide the first command the at least one processor is further configured to:
   determine a presently selected content delivery device;
   identify one or more commands that correspond to the transition with respect to the presently selected content delivery device; and
   provide the one or more identified commands to the presently selected content delivery device.

9. The system of claim 1, wherein the first command comprises an infrared (IR) command.

10. The system of claim 1, wherein the first command comprises a scroll command.

11. The system of claim 1, wherein the object comprises one or more fingers.

12. The system of claim 1, wherein the object comprises one or more fingers detected in relation to a face.

13. The system of claim 1, wherein the object comprises one or more fingers detected in relation to a body.

14. The system of claim 1, wherein the device comprises a content delivery device.

15. The system of claim 1, wherein the first command is provided via an infra-red light emitting diode.

16. The system of claim 1, wherein the device is not configured for control by touch-free gestures.

17. A non-transitory computer-readable medium having instructions encoded thereon that, when executed by a processing device, cause the processing device to:
receive one or more first images from an image sensor;
process the one or more first images to detect a first position of an object;
define a first region in relation to the position of the object;
define a second region in relation to the first region;
receive one or more second images from the image sensor;
process, by the processing device, the one or more second images to detect a transition of the object from the first region to the second region;
receive one or more third images from the image sensor;
process the one or more third images to detect a transition of the object from the second region to the first region; and
provide a command that corresponds to the transition of the object from the second region to the first region.

18. The non-transitory computer-readable medium of claim 17, wherein the command comprises a command to stop an operation corresponding to a previous command.

19. The non-transitory computer-readable medium of claim 17, wherein motion of the object detected within the first region corresponds to one or more operations at a first speed and wherein motion of the object detected within the second region corresponds to one or more operations at a second speed that is faster than the first speed.

20. A method comprising:
receiving one or more first images from an image sensor;
processing the one or more first images to detect a first position of an object, the object comprising one or more fingers detected in relation to a face;
defining a first region in relation to the position of the object;
defining a second region in relation to the first region;
receiving one or more second images from the image sensor;
processing, by a processing device, the one or more second images to detect a transition of the object from the first region to the second region;
determining a first command associated with a device and that corresponds to the transition of the object from the first region to the second region; and
providing the determined first command to the device.

* * * * *